United States Patent
Williams et al.

(10) Patent No.: US 12,063,894 B2
(45) Date of Patent: Aug. 20, 2024

(54) CONTROL SYSTEM FOR A BALE WRAPPING DEVICE

(71) Applicant: KUHN NORTH AMERICA, INC., Brodhead, WI (US)

(72) Inventors: Shane Williams, Stoughton, WI (US); Justin H. Mainwaring, Brodhead, WI (US); Grant J. Heineman, Brooklyn, WI (US); Jacob L. Peterson, Brodhead, WI (US); Dana Eric Redman, Orfordville, WI (US); Thomas J. Hoffman, DeForest, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 115 days.

(21) Appl. No.: 17/867,270

(22) Filed: Jul. 18, 2022

(65) Prior Publication Data

US 2024/0016095 A1    Jan. 18, 2024

(51) Int. Cl.
*A01F 15/00* (2006.01)
*A01F 15/07* (2006.01)

(52) U.S. Cl.
CPC .... *A01F 15/071* (2013.01); *A01F 2015/0745* (2013.01); *A01F 2015/076* (2013.01)

(58) Field of Classification Search
CPC ............... B65B 11/008; B65B 2210/16; B65B 2210/18; A01F 2015/076; A01F 2015/0745; A01F 2015/0725; A01F 2015/073; A01F 15/071
See application file for complete search history.

(56) References Cited

U.S. PATENT DOCUMENTS

| | | | | |
|---|---|---|---|---|
| 5,433,058 A * | 7/1995 | Peterson | ............... | B65B 11/008 53/399 |
| 5,531,061 A * | 7/1996 | Peterson | ................. | B65B 61/06 53/529 |
| 5,596,864 A * | 1/1997 | Reeves | ................. | A01F 15/071 53/399 |
| 5,661,956 A * | 9/1997 | Tardif | ................... | B65B 11/008 53/556 |
| 6,070,400 A * | 6/2000 | Peeters | ................. | A01F 15/071 53/588 |

(Continued)

*Primary Examiner* — Andrew M Tecco
(74) *Attorney, Agent, or Firm* — Oblon, McClelland, Maier & Neustadt, L.L.P.

(57) ABSTRACT

A system and method for automatic wrapping bales in a bale wrapper, including placing a bale on a loading table and performing a wrapping cycle. The wrapping cycle including rotating a wrapping hoop to apply a wrapping material to a bale surface, moving a bale pushing device from a first position toward a second position to push the bale through the wrapping hoop, dispensing from a first material applicator and a second material applicator, determining presence of the wrapping material, by a sensor on the wrapping hoop, adjusting based on the determining, a ratio of moving speed to rotational speed of the wrapping hoop, to apply a predetermined amount of wrapping material independent of the presence of wrapping material dispensing, continuing to move the bale pushing device until the second position is reached, stopping the rotation of the wrapping hoop, and moving the bale pushing device to the first position.

24 Claims, 20 Drawing Sheets

(56) References Cited

U.S. PATENT DOCUMENTS

| | | | |
|---|---|---|---|
| 9,374,946 B2* | 6/2016 | D'Amours | A01F 25/14 |
| 11,497,172 B2* | 11/2022 | Giguère | A01F 15/071 |
| 11,815,907 B2* | 11/2023 | Eubanks | G05D 1/0278 |
| 2022/0261009 A1* | 8/2022 | Eubanks | A01F 15/071 |

* cited by examiner

CONTROL SYSTEM FOR A BALE WRAPPING DEVICE

BACKGROUND OF THE INVENTION

Field of the Invention

The present invention relates to the field of bale wrapping devices. More specifically, the present invention relates to a control system for an inline and individual bale wrapping device configured for applying material over bale(s) passing through the bale wrapping device and to a method of operation thereof.

Description of the Related Art

Baling of forage crops such as hay has traditionally been used to preserve these crops to feed livestock when needed, such as during the winter or other non-growing seasons or when adequate grazing resources are not otherwise available.

Typically, hay is formed into large cylindrical rolls or compressed rectangular bundles, known as bales, by a baler. A bale wrapping device can be used to wrap the bales in a wrapping material to reduce exposure to the elements or limit air infiltration to further preserve bales of crops until they are needed. Bales can be wrapped individually, in groups, or end-to-end in a line (also known as inline bale wrapping.)

The bales are formed in a field by the baler and are then transported to a storage area to be kept until they are needed for animal feed or bedding. If there is not sufficient space in a building or shed for storing the bales, the bales can be wrapped and left outside during storage. Ideally, bales that have differing moisture contents require different storage conditions to maintain optimum quality. Bales with moisture content above a certain threshold value need to maintain an anaerobic state for proper fermentation to occur. Dryer materials that do not reach the moisture content value needed for fermentation can mold if they are not allowed to breathe. If the material is even drier to the level that it will not mold, a sealed environment can still lead to condensation that can create a layer of spoiled material on the outer layer of the bale. Additionally, the optimum amount of wrapping material to maintain desired bale quality can change based on the duration of expected storage time. For example, a bale that is intended to be used in three months may need less wrapping material to maintain desired quality than if the same bale were to remain in storage for a full year.

The bale wrapping devices currently used for wrapping bales tend to suffer from several drawbacks. For example, and without being limiting, such bale wrapping devices dispense wrapping material, which is most commonly a plastic film but may be comprised of various other suitable materials or combinations thereof, around a bale or a group of bales according to a set ratio determined by a mechanical setting or a programmed setting based on theoretical bale and wrap application parameters and are not reactive to the actual application parameters and changing material parameters of the bales being wrapped. Additionally, if the operator fails to update wrapping parameters when bale parameters change, inadequate or wasteful wrapping material use may occur. Furthermore, the current bale wrapping devices do not take into account bale moisture content and the expected storage time, and thereby do not apply the appropriate amount of wrapping material.

Instead, due to the lack of adaptability, it is commonplace to overapply wrapping material to make sure enough wrapping material is applied for all situations. This makes the process cost prohibitive for lower value feedstocks where there is still significant benefit to protecting the bale from spoilage and mold. For higher value feedstocks, an inappropriate amount of wrapping material may be applied.

Additionally, bale wrappers need careful monitoring and significant intervention while starting a row of bales and monitoring levels of wrapping material. The conventional system requires the operator to start the row of bales with the wrapper in a first configuration and then once the row has started, shift the bale wrapper to a second configuration. The end of a row of bales must also be sealed by either including a fully wrapped bale which is a waste of additional wrapping material by wrapping an already wrapped bale or including an expensive end cap that requires manual application.

Concurrently, the levels of wrapping material must be monitored by the operator to make sure that when the wrapping material runs out, the rolls are replenished before restarting the wrapping process. In the current bale wrapping devices, when a roll of wrapping material is no longer dispensing, the wrapping process is stopped for the roll to be replenished. This replenishment typically occurs by removing the empty rolls from the carriers and manually lifting full rolls of wrapping material onto the carriers. All of these interventions are labor intensive and reduce the efficiency of the bale wrapping device.

Furthermore, improper compression settings and changes in terrain and ground conditions can lead to inadequate bale compression and reduced storage quality if not addressed. In the current bale wrapping devices the brakes are adjusted manually if the compression does not appear to be appropriate. Manual adjustment of compression may not be performed timely and consistently, and will result in substantially less than ideal compression.

In view of the above, there is a need for an improved bale wrapping device and method, which would be able to overcome, or at least reduce, some of the above discussed problems with the current bale wrapping devices and methods.

SUMMARY OF THE INVENTION

An aspect is a method for automatic wrapping a group of bales in a bale wrapper, that includes placing a first bale in the group of bales on a loading table of the bale wrapper; performing a wrapping cycle including: rotating a wrapping hoop to apply a wrapping material to a bale surface; moving a bale pushing device from a first position toward a second position to push the first bale through the wrapping hoop; dispensing from at least a first material applicator and a second material applicator; determining presence of the wrapping material, by at least one sensor on the wrapping hoop; adjusting based on the determining, at least a ratio of moving speed of the bale pushing device to rotational speed of the wrapping hoop, to apply a predetermined amount of wrapping material independent of the presence of wrapping material dispensing from the first material applicator and the second material applicator; continuing to move the bale pushing device until the second position is reached; stopping the rotation of the wrapping hoop; and moving the bale pushing device from the second position to the first position.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE PREFERRED EMBODIMENTS

Figure 1:
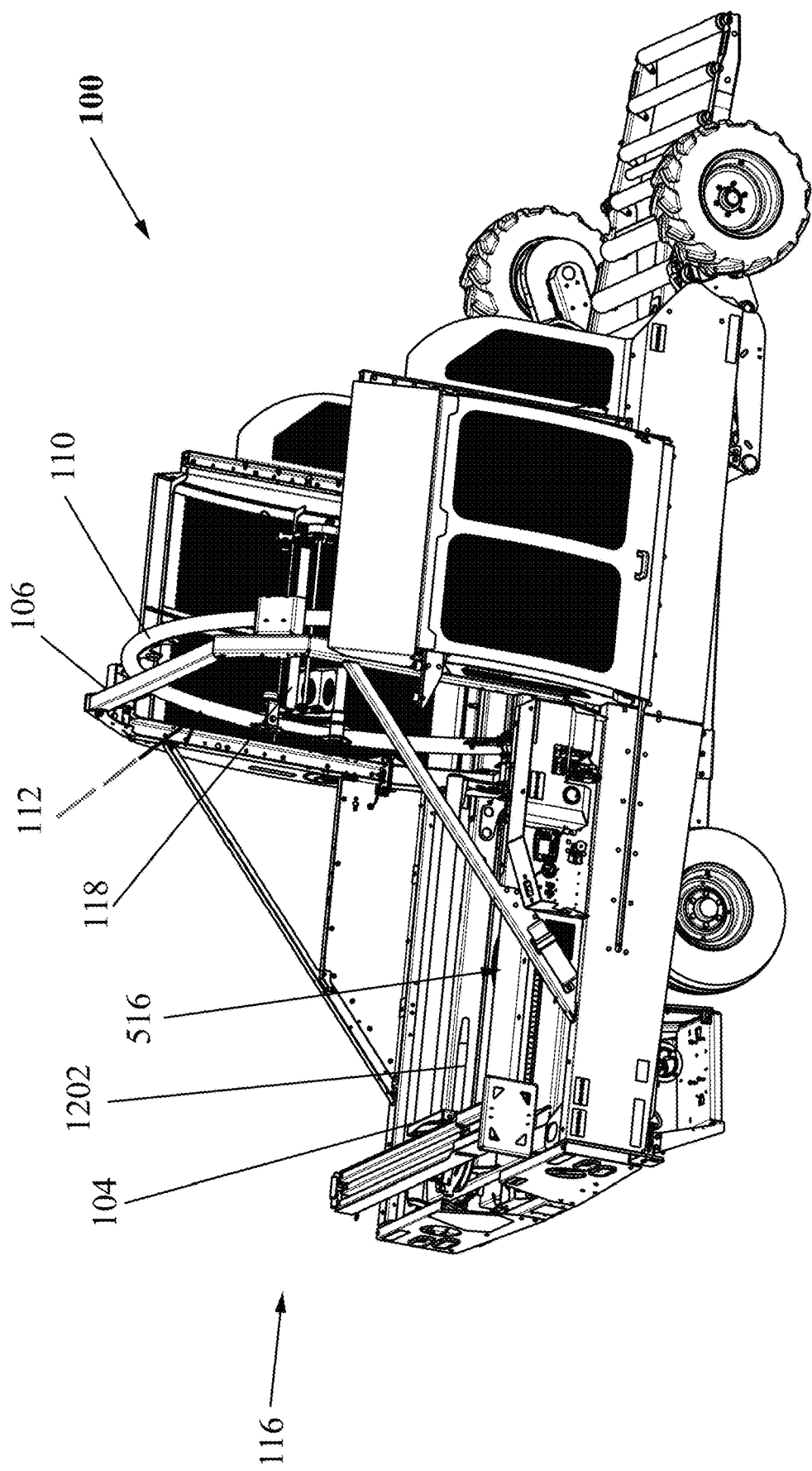
FIG. 1 is a perspective view of the bale wrapping device, according to one embodiment.

Various methods, devices, and apparatuses are described below to provide an example of at least one embodiment of the claimed subject matter. No embodiment described below limits any claimed subject matter and any claimed subject matter may cover apparatuses and methods that differ from those described below. The claimed subject matter is not limited to methods, devices, and apparatuses having all of the features of any one method, device, or apparatus described below or to features common to multiple or all of the methods, devices, and apparatuses described below. Subject matter that may be claimed may reside in any combination or sub-combination of the elements or process steps disclosed in any part of this document including its claims and figures. Accordingly, it will be appreciated by a person skilled in the art that methods, devices, and apparatuses disclosed in accordance with the teachings herein may embody any one or more of the features contained herein and that the features may be used in any particular combination or sub-combination that is physically feasible and realizable for its intended purpose.

Furthermore, it is possible that methods, devices, and apparatuses described below are not an embodiment of any claimed subject matter. Any subject matter that is disclosed in and methods, devices, and apparatuses described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

In the following description, the same numerical references refer to similar elements. The embodiments, geometrical configurations, materials mentioned, and/or dimensions shown in the figures or described in the present description are embodiments only, given solely for exemplification purposes.

Moreover, although the embodiments of the bale wrapping device and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation there in between, as well as other suitable geometrical configurations, may be used for the bale wrapping device, as will be briefly explained herein and as can be easily inferred here from by a person skilled in the art. Moreover, it will be appreciated that positional descriptions such as "above", "below", "left", "right" and the like should, unless otherwise indicated, be taken in the context of the figures and should not be considered limiting.

Referring to FIG. 1, illustrated therein is a perspective view of a bale wrapping device 100 for wrapping a bale. The bale wrapping device 100 includes a bale moving (pushing) device 104, a bale wrapping frame 106, a bale wrapping mechanism 118, a wrapping hoop 110, a moisture probe 1202, a loading table 516 and a wrapping material (Not shown).

The bale is disposed on the loading table 516 along the direction 116.

Figure 2:
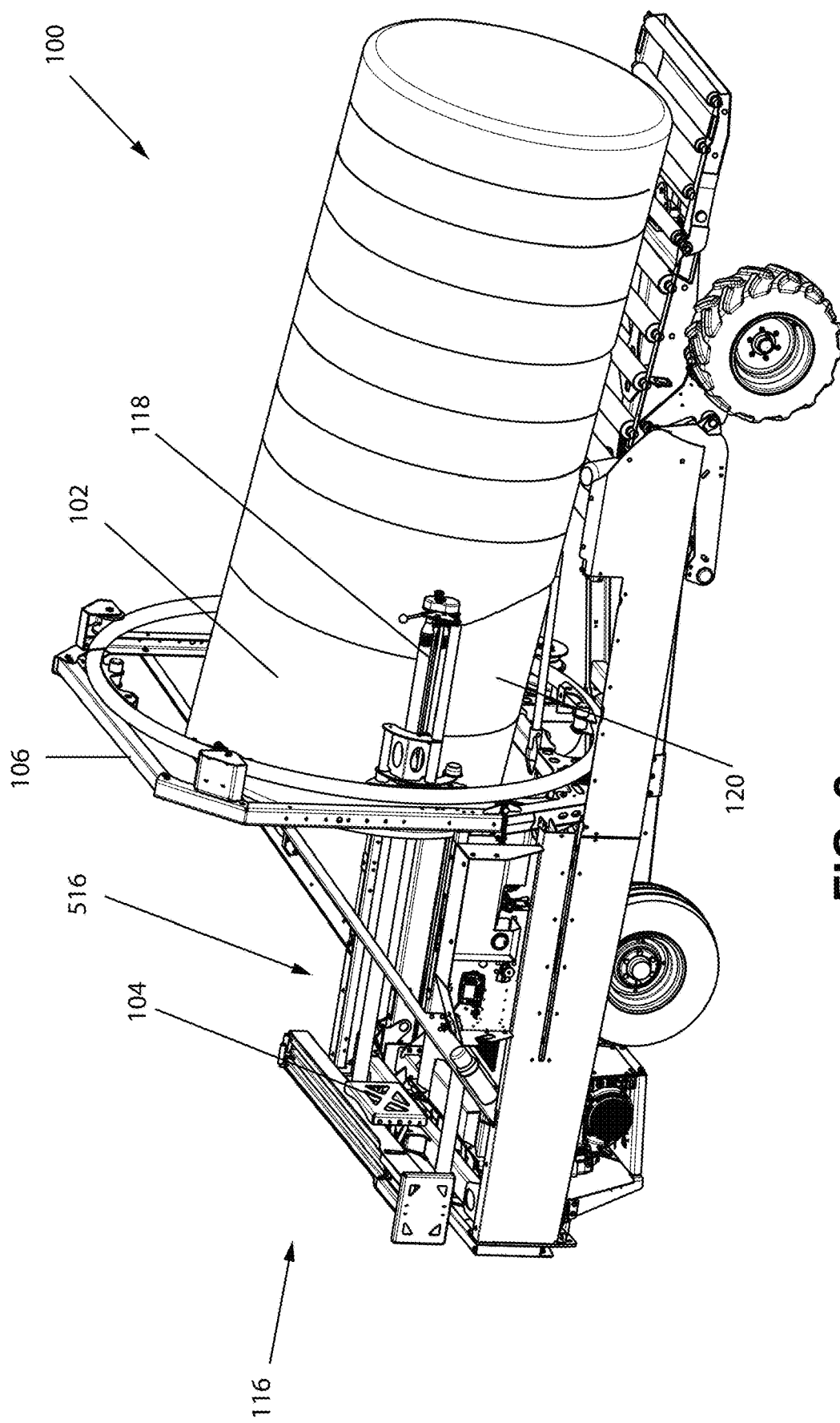
FIG. 2 is a perspective view of the bale wrapping device illustrated with a group of bales and applying a wrapping layer, according to one embodiment.

FIG. 2 is a perspective view of a bale wrapping device with a wrapping layer 120 being applied to a group of bales. FIG. 2 shows a group of bales 102, along with a wrapping material applicator 118. In an embodiment, for ease of illustration, FIG. 2 only illustrates one wrapping material applicator, as the second applicator is obstructed by the group of bales.

Figure 3:
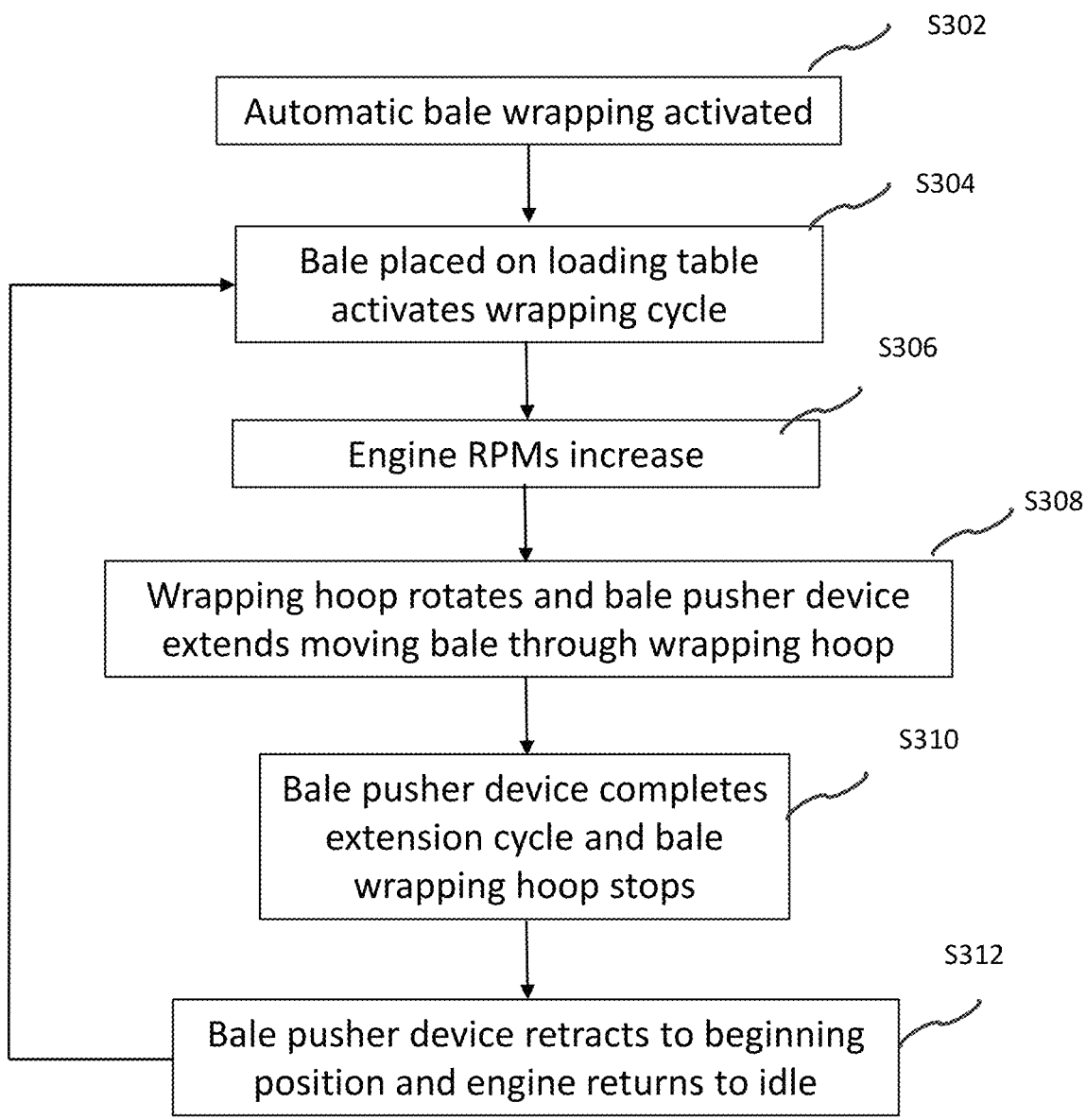
FIG. 3 is a flowchart for a method for wrapping bales in a bale wrapper, according to one embodiment.

FIG. 3 is a flowchart for a method for an automatic bale wrapping cycle in a bale wrapper. In step S302, the automatic bale wrapping cycle is activated, e.g., by pressing a start button, or entering a start command through a touch screen. In step S304, a first bale in the group of bales is placed on a loading table of the bale wrapper, which causes a wrapping cycle to be initiated. The wrapping cycle includes, step S306, the ramping up of the engine speed in order to dispense wrapping material. In step S308, rotating a wrapping hoop 110 to apply a wrapping material to a bale 102 surface and moving a bale pushing device from a first position to a second position to push the first bale through the wrapping hoop until the second position is reached. In step S310, when the bale pusher device completes extension, i.e., reaches the second position, stopping the rotation of the wrapping hoop 110. In step S312, moving the bale pushing device from the second position back to the first position. At least one sensor on the wrapping hoop 110 determining the presence of wrapping material dispensing from at least a first material applicator 118 and a second material applicator 118, and adjusting based on the determining, at least a ratio of moving speed of the bale pushing device to rotational speed of the wrapping hoop 110, to apply a predetermined amount of wrapping material independent of the presence of material dispensing from the first material applicator 118 and the second material applicator 118.

Figure 4:
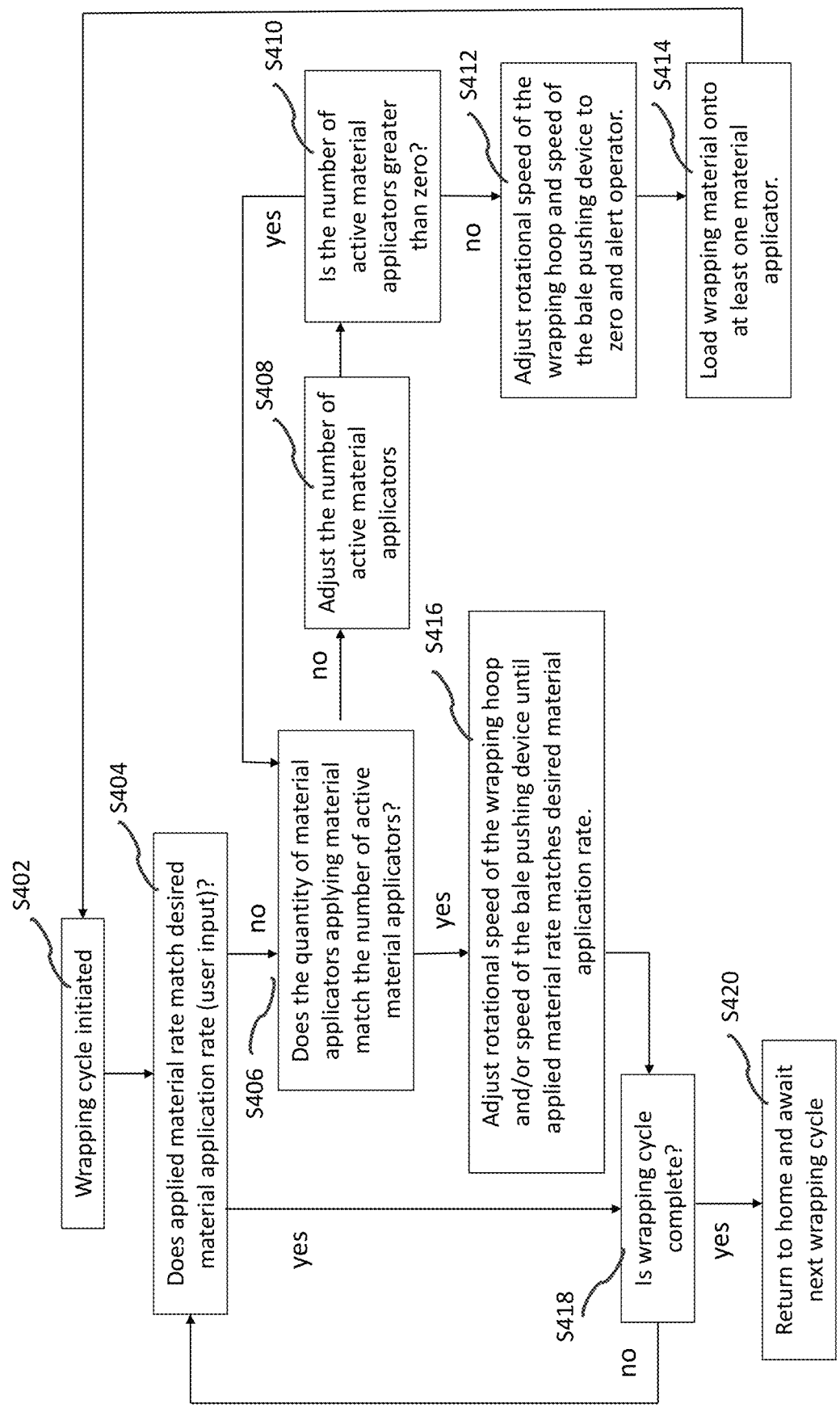
FIG. 4 is a flowchart for a wrapping cycle for bales in a bale wrapper, according to one embodiment.

FIG. 4 is a flowchart for a wrapping cycle for bales in a bale wrapper. In step S402, the wrapping cycle is initiated, for example by starting an engine of the bale wrapper. The operator may input or select a desired material application rate. In S404, the rate at which the material is being applied is compared to the desired material application rate, and a check is made for a match. In S406, the quantity of material applicators being used to apply the material is compared to the number of active material applicators, and a check is made for a match. In step S408, in the case that the quantity of material applicators being used does not match the number of active material applicators, the number of active material applicators is adjusted. In S410, a check is made to verify that the number of active material applicators is greater than zero. If yes, step S406 is repeated. If no, in step S412, the rotational speed of the wrapping hoop is adjusted to zero and the speed of the bale pushing device is adjusted to zero, and an alert is sent to the operator. In S414, wrapping material is loaded onto at least one material applicator, then the wrapping cycle is started in S402.

Again, in S404, the rate at which the material is being applied is compared to the desired material application rate, and a check is made for a match. If there is not a match, in S406, the quantity of material applicators being used to apply the material is compared to the number of active material applicators, and a check is made for a match. If there is a match, in S416, the rotational speed of the wrapping hoop 110 and/or speed of the bale pushing device 104 is adjusted until an applied material rate matches a desired material application rate.

In S418, when the applied material rate matches the desired material application rate, and the wrapping cycle is complete, in S420, the bale pushing device 104 returns to the initial position, and the bale wrapper awaits a next wrapping cycle.

For example, in S406, at a first time the sensor on the wrapping hoop 110 determines the presence of wrapping material dispensing from a first material applicator and a second material applicator and the wrapping material is applied at a predetermined amount. In S408, at a second time the sensor on the wrapping hoop 110 determines the presence of wrapping material dispensing from a first material applicator only (YES in S410), and based on the determining, in S416, the ratio of moving speed of the bale pushing device to rotational speed of the wrapping hoop is reduced to apply the predetermined amount of wrapping material. In S408, at a third time the sensor on the wrapping hoop 110 determines the presence of wrapping material dispensing from the first material applicator and the second material applicator and based on the determining, in S416, the ratio of moving speed of the bale pushing device to rotational speed of the wrapping hoop is increased to apply the predetermined amount of wrapping material.

In another example, in S406, at a first time the sensor on the wrapping hoop 110 determines the presence of wrapping material dispensing from a first material applicator and a second material applicator and the wrapping material is applied at a predetermined amount. At a second time, in S408, the sensor on the wrapping hoop determines the presence of wrapping material dispensing from a first material applicator, a second material applicator and a third material applicator and based on the determining, in S416, the ratio of moving speed of the bale pushing device to rotational speed of the wrapping hoop is increased to apply the predetermined amount of wrapping material.

Figure 5:
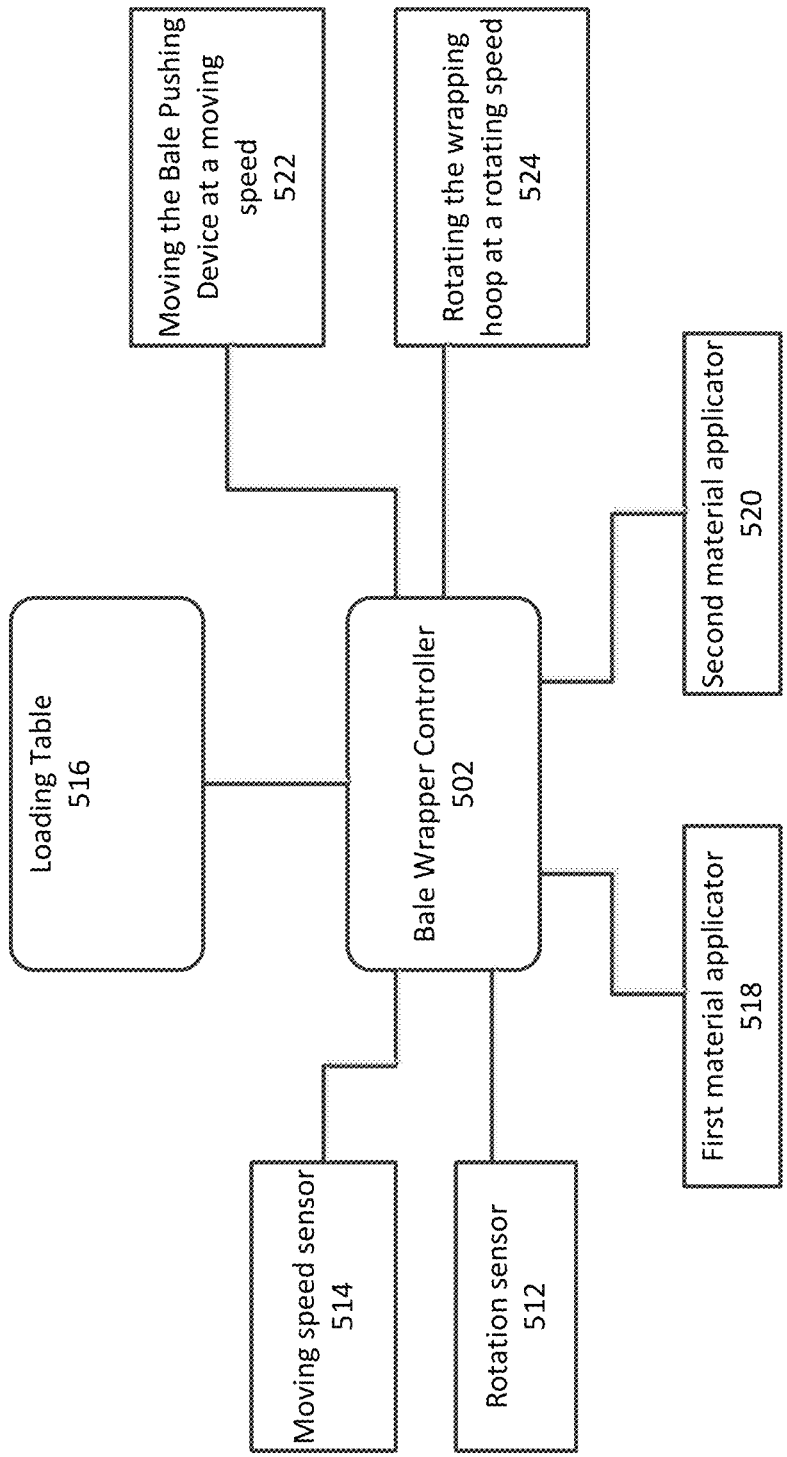
FIG. 5 is a block diagram of a control system for a bale wrapping device with wrapping material monitoring, according to one embodiment.

FIG. 5 is a block diagram of a control system for a bale wrapping device, according to one embodiment. The control system is configured with a bale wrapper controller 502. The bale wrapping controller 502 is a microcontroller configured to receive sensor signal inputs and control signal outputs. The bale wrapping controller 502 includes program instructions for determining the control output signal based on received sensor input signals. In some embodiments, the bale wrapping controller 502 receives signals for setting one or more control parameters and can send messages and/or alarms to an output device, such as a display device, sound output device, or an audible speaker device.

The bale wrapper controller 502 receives a movement speed signal from a moving speed sensor 514 and receives a rotation speed signal from a rotation sensor 512. The moving speed sensor 514 measures the movement speed of the bale pushing device. The moving speed sensor 514 may be an induction sensor, a magnetic sensor, or laser sensor. In an embodiment, the movement speed of the bale pushing device 104 may be calculated from the speed of the actuator that moves the bale pushing device 104. The rotation sensor 512 may be a magnetic sensor, or laser sensor, that sends a detection signal each time a point on the wrapping hoop 110 is detected. The bale wrapping controller 502 calculates the rotation speed of the wrapping hoop 110 based on a rate of receiving the detection signal from the rotation sensor 512.

The bale wrapper controller 502 receives an amount of wrapping material signal from each of a first material applicator 518 and a second material applicator 520. The bale wrapper controller 502 may also include controls to operate a loading table 516, for example to adjust the height of the table, or to measure the weight of bales placed on the table 516.

The bale wrapper controller 502 controls moving of the Bale Pushing Device at a moving speed 522. The bale wrapper controller 502 controls rotation of the wrapping loop 110 at a rotating speed 524.

In a further embodiment, in S416, the ratio of moving speed of the bale pushing device to rotational speed of the wrapping hoop is determined by the controller 502. The bale wrapper controller 502 receives a wrapping material signal indicative of the presence of the wrapping material dispensing from at least a first material applicator 518 and a second material applicator 520. Based on the wrapping material signal, in S406, a number of active material applicators that are applying wrapping material is determined. Based on the determination of the quantity of active material applicators, in S416, the bale wrapper controller 502 adjusts at least one of the moving speed 522 of the bale pushing device 104 and rotational speed 524 of the wrapping hoop 110 to apply the predetermined amount of wrapping material.

Figure 6:
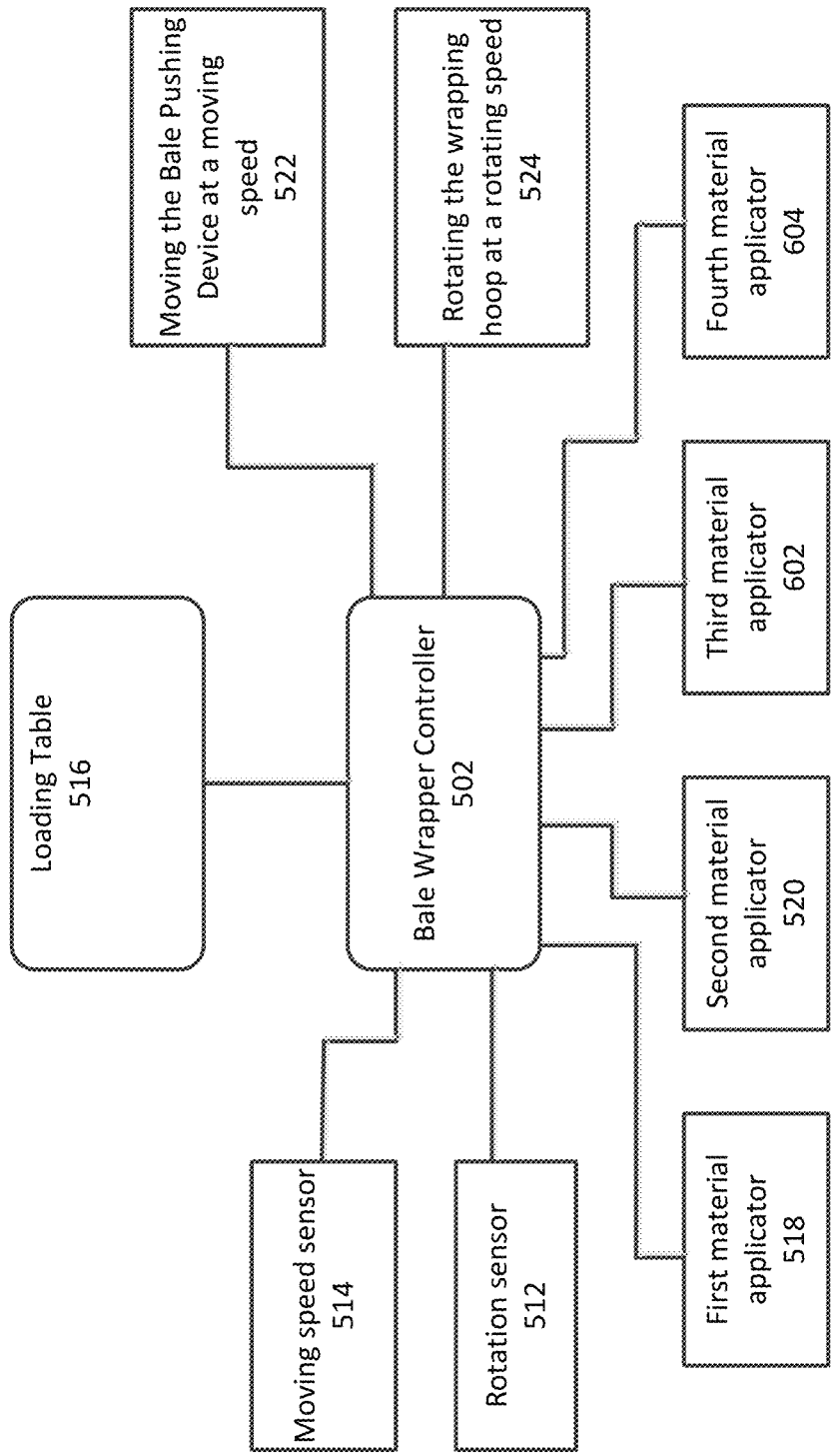
FIG. 6 is a block diagram of a control system for a bale wrapping device, according to one embodiment with wrapping material monitoring.

FIG. 6 is a block diagram of a control system for a bale wrapping device, according to one embodiment. Regarding FIG. 6, the bale wrapper controller 502 receives an amount of wrapping material signal from each of a third material applicator 602 and a fourth material applicator 604.

In an additional embodiment, the bale wrapper controller, in S406, receives a wrapping material signal indicative of the presence of the wrapping material dispensing from at least one of a first material applicator 518, a second material applicator 520 and a third material applicator 602. Based on the wrapping material signal, the controller 502 determines a number of active material applicators. Based on the determination of the quantity of active material applicators, in S416 the bale wrapper controller 502 adjusts at least one of the moving speed 522 of the bale pushing device 104 and rotational speed 524 of the wrapping hoop 110 to apply the predetermined amount of wrapping material.

In another embodiment, the bale wrapper controller 502 receives (NO in S410) a wrapping material signal indicative of no wrapping material on any of a first material applicator 518, a second material applicator 520, a third material applicator 602, and a fourth material applicator 604, and when the quantity of active material applicators is zero, in S412, the bale wrapper controller 502 adjusts the moving speed 522 of the bale pushing device 104 and rotational speed 524 of the wrapping hoop 110 to zero.

Figure 7:
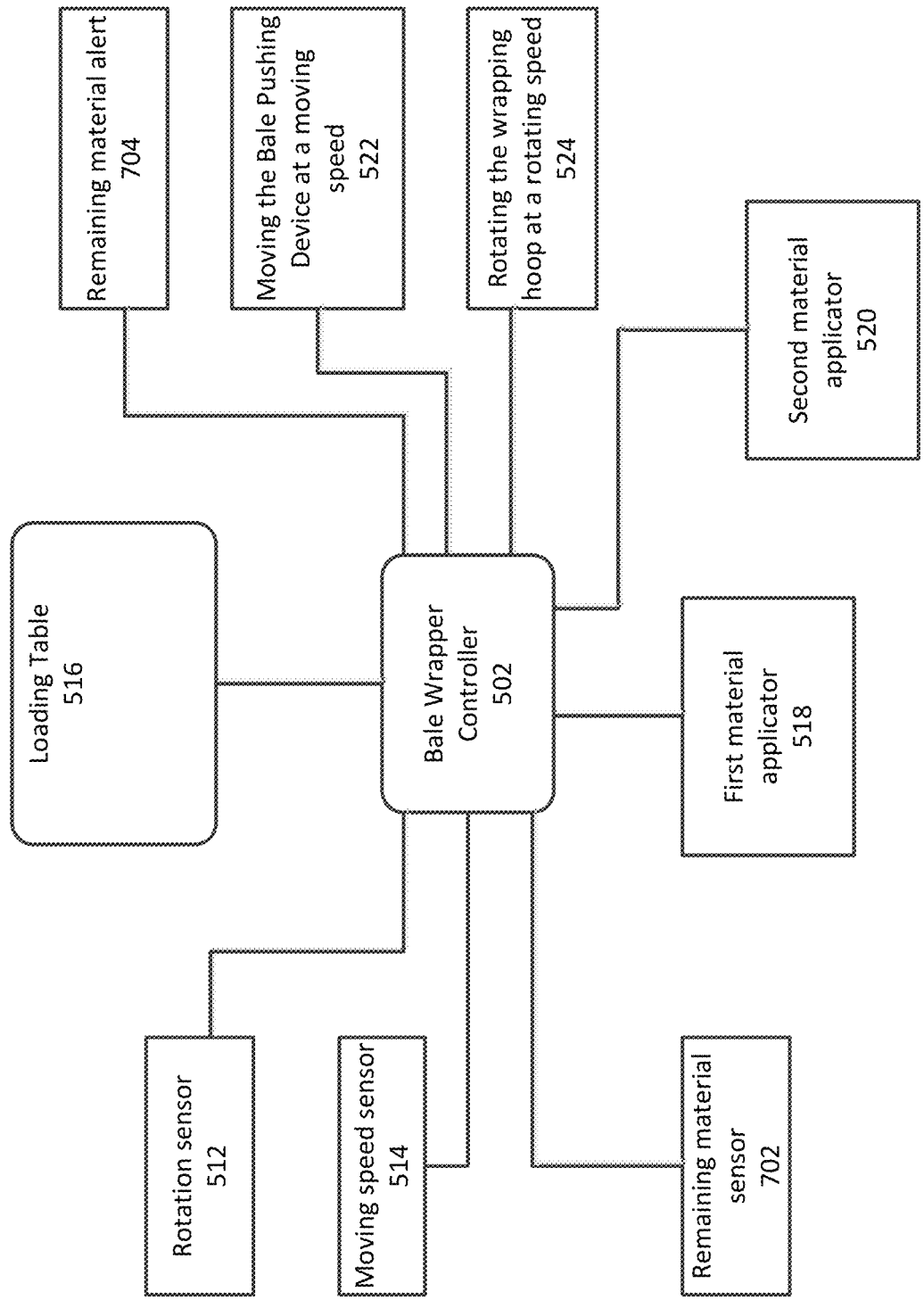
FIG. 7 is a block diagram of a control system for a bale wrapping device with remaining material alert, according to one embodiment.

FIG. 7 is a block diagram of a control system for a bale wrapping device with remaining material alert. In another method for wrapping a group of bales in a bale wrapper, a remaining material sensor 702 measures a parameter indicative of at least a first remaining amount of material on at least a first material applicator, and the bale wrapper controller 502 informs an operator when the at least first remaining amount of material is below a predetermined remaining amount of material threshold.

In an embodiment, the remaining material sensor 702 measures a size of a roll of wrapping material on at least the first material applicator 518 and when the size of the roll of material is below a predetermined remaining amount of material threshold the bale wrapper controller 502 outputs an alert 704 for the operator through at least one of a visual or audible warning. The remaining material sensor 702 may measure size of a roll (thickness of wrapping material) using a light sensor, or other distance sensor device.

In another embodiment, the remaining material sensor 702 measures a speed of a roll of wrapping material on at least the first material applicator 518 and when the speed of the roll of material is above a predetermined remaining amount of material threshold, the bale wrapper controller 502 outputs an alert 704 for the operator through at least one of a visual or audible warning. The remaining material sensor 702 may include a magnetic sensor, or laser sensor, that detects a point on the material applicator shaft. The bale controller 502 measures the rotation speed of the material applicator shaft based on the detection signal from the remaining material sensor 704.

In a further embodiment, the remaining material sensor 702 measures a speed of a roll of wrapping material on at least the first material applicator 518 and when the speed of the roll of material is below a predetermined remaining amount of material threshold, indicating that the wrapping material is not being applied, the bale wrapper controller 502 outputs an alert 704 for the operator through at least one of a visual or audible warning. The remaining material sensor 702 may include a magnetic sensor, or laser sensor, that detects a point on the material applicator shaft. The bale controller 502 measures the rotation speed of the material applicator shaft based on the detection signal from the remaining material sensor 704.

In a further embodiment, the remaining material sensor 702 measures a sound of a roll of wrapping material on at least the first material applicator 518 and when the sound of the roll of material corresponds to a level that indicates the roll is below a predetermined remaining amount of material threshold, the bale wrapper controller 502 outputs an alert 704 for the operator through at least one of a visual or audible warning. The remaining material sensor 702 measures sound using a noise canceling microphone. The noise canceling microphone is positioned in close proximity to the associated material applicator so as to not pick up sound from other material applicators. Preferably, positioning of the noise canceling microphone at an appropriate position is performed through testing before the bale wrapping device is deployed.

In a further embodiment, the remaining material sensor 702 measures a parameter of a roll of wrapping material on at least the first material applicator 518 and when the parameter of the roll of material corresponds to a level that indicates the roll is below a first predetermined remaining amount of material threshold, the bale wrapper controller 502 outputs an alert 704 for the operator through at least one of a first visual or audible warning and when the parameter of the roll of material corresponds to a level that indicates the roll is below a second predetermined remaining amount of material threshold, the bale wrapper controller 502 outputs an alert 704 for the operator through at least one of a second visual or audible warning, wherein the first visual or audible warning is different from the second visual or audible warning.

In one embodiment of the invention, the bale wrapper controller 502 outputs an alert for the operator of a status of the bale wrapper through a visual warning wherein the visual warning includes flashing at least a transport light of the bale wrapper and in another embodiment of the invention the bale wrapper controller 502 outputs an alert 704 for the operator that a roll of material is below a first predetermined remaining amount of material threshold with a first visual warning, wherein the first visual warning include flashings at least a transport light of the bale wrapper.

Figure 8:
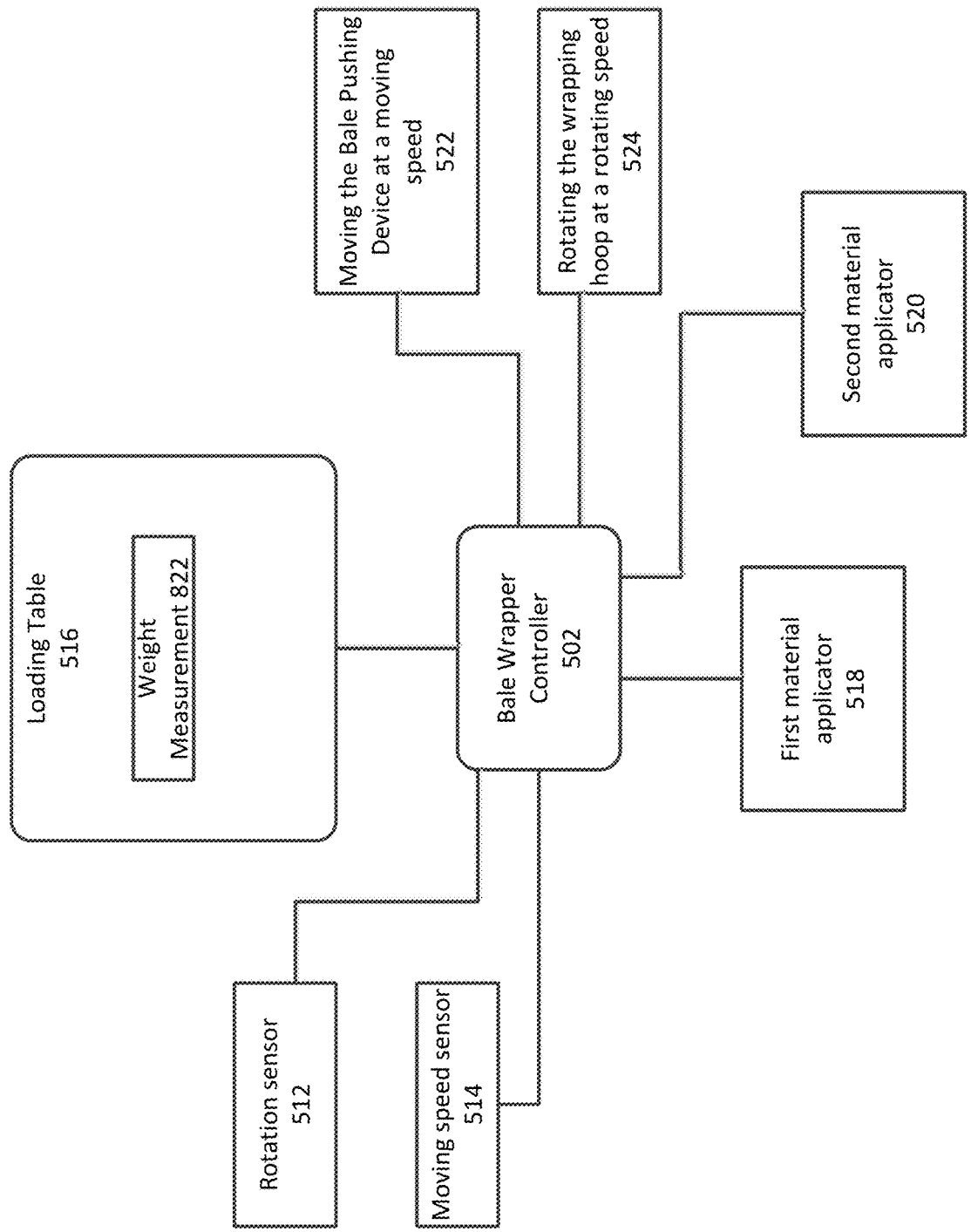
FIG. 8 is a block diagram of a control system for a bale wrapping device with bale weight measurement, according to one embodiment.

FIG. 8 is a block diagram of a control system for a bale wrapping device with bale weight measurement. In another improved method for wrapping a group of bales in a bale wrapper, a bale is placed on a loading table 516 of the bale wrapper and a weight measurement 822 of material in the bale is determined. The weight measurement 822 may be obtained using an electrical or mechanical weight scale device. The weight scale device is connected to the bale wrapper controller 502. In some embodiments, the weight is obtained using one or more weight sensors, which measure force, such as a piezoelectric sensor. In such case, the bale wrapper controller 502 calculates the weight based on the force signals. The determining is completed by a first weight signal interpretation prior to the placement of the bale on the loading table 516 and a second weight signal interpretation after the bale has been placed on the loading table of the bale wrapper. The bale wrapper controller 502 determines a variation between the first weight signal and second weight signal which is indicative of the weight of the bale on the loading table.

An aspect is a method for wrapping a group of bales in a bale wrapper, that includes placing a bale on a loading table of the bale wrapper, and determining a weight of material in the bale. The determining is completed by a first weight signal interpretation prior to the placement of the bale on the loading table and a second weight signal interpretation after the bale has been placed on the loading table of the bale wrapper, and a variation between said first weight signal and second weight signal is indicative of the weight of the bale on the loading table. The method further includes performing a wrapping cycle including: rotating a wrapping hoop to apply a wrapping material to a bale surface; moving a bale pushing device from a first position toward a second position to push the first bale through the wrapping hoop; dispensing from at least a first material applicator and a second material applicator; determining presence of the wrapping material, by at least one sensor on the wrapping hoop; continuing to move the bale pushing device until the second position is reached; stopping the rotation of the wrapping hoop; and moving the bale pushing device from the second position to the first position.

In a further embodiment, the variation between a third weight signal interpretation prior to the placement of a second bale on the loading table and a fourth weight signal interpretation after the second bale has been placed on the loading table of the bale wrapper is recorded by the bale wrapper controller 502. The controller 502 determines variation between said third weight signal and fourth weight signal as an indication of the weight of the second bale on the loading table 516, wherein the third weight signal and the first weight signal may be different. The controller 502 may determine each of the first, second, third, and fourth weight signals as an average of multiple of weight signals from sensors placed between the loading table 516 and the ground.

In one embodiment, weight sensors are positioned in at least a first wheel spindle of a first wheel of the bale wrapper and in another embodiment the weight sensors are positioned in at least a first wheel spindle of a first wheel of the bale wrapper and a second wheel spindle of a second wheel of the bale wrapper. In a further embodiment, the weight sensors are placed between the loading table 516 and a bale wrapper frame to more directly measure the variation between said first weight signal and second weight signal.

The variation between at least the first weight signal and second weight signal indicative of the weight of the bale on the loading table 516 can be further used to determine the presence of a bale on the loading table 516. In one embodiment the controller 502 determines variation between the first weight signal and second weight signal and compares the variation against a threshold weight signal. The threshold weight signal is indicative of a minimum bale weight that can be used to initiate a wrapping cycle. If the variation between the first weight signal and the second weight signal is above a predetermined threshold weight signal, the controller 502 records the variation between the weight signals and the wrapping cycle is initiated to begin wrapping the bale.

Additionally, the variation between at least the first weight signal and second weight signal, indicative of the weight of a first bale on the loading table 516 and the variation between the third weight signal and fourth weight signal, indicative of the weight of the second bale on the loading table 516, can be recorded by the controller 502 to track a cumulative weight of material in at least a first bale and a second bale.

Figure 9:
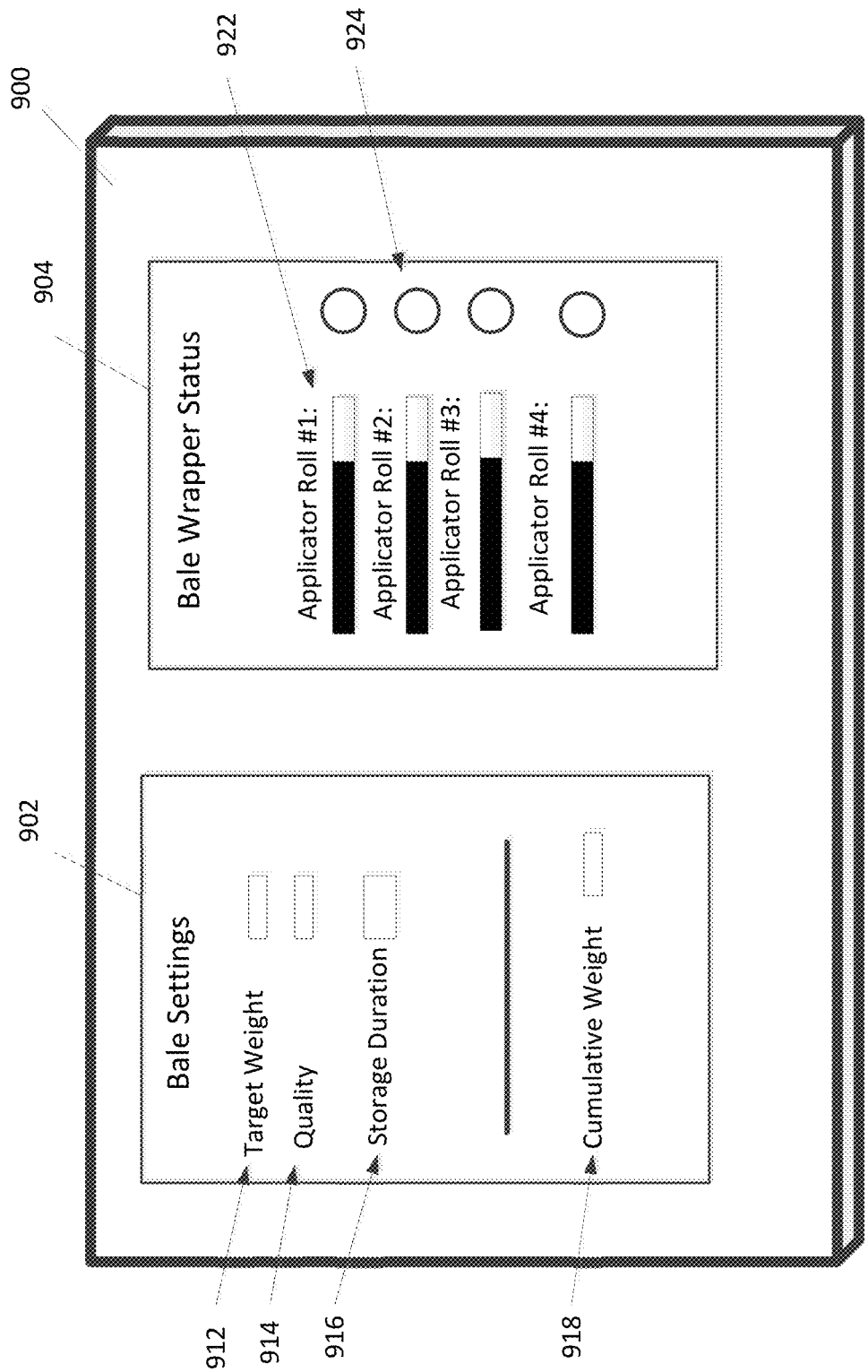
FIG. 9 illustrates an interactive display, according to one embodiment.

FIG. 9 illustrates an interactive display. The bale wrapper may be equipped with an interactive interface, in which an operator may input and/or change base settings and may view status information of the bale wrapper. The interactive interface may be a display device or a touch screen display device 900. The display device 900 may include an input section 902 for inputting bale settings, and a status section 904 for displaying bale wrapper status information. The input section 902 may also display certain data, such as a cumulative weight 918 of bales. Further, the controller 502 may compare the cumulative weight to a target weight threshold. Once the cumulative weight exceeds the target weight threshold, the bale wrapper controller 502 initiates a closing cycle to complete the row of bales. This function allows the operator to set a target weight threshold 912 for a row of bales and the bale wrapper controller 502 can inform the operator when the target weight threshold has been reached.

In one embodiment of the invention, the bale wrapper adjusts the quantity of wrapping material applied to the row of bales, based on the position within the row of bales. For example, when wrapping a row of bales a first quantity (number of layers) of wrapping material is applied to a first portion of the row and a second quantity of wrapping material is applied to a second portion of the row of bales, wherein the first quantity of wrapping material is different from the second quantity of wrapping material based on position of the bale wrapper along a row of bales.

Figure 10:
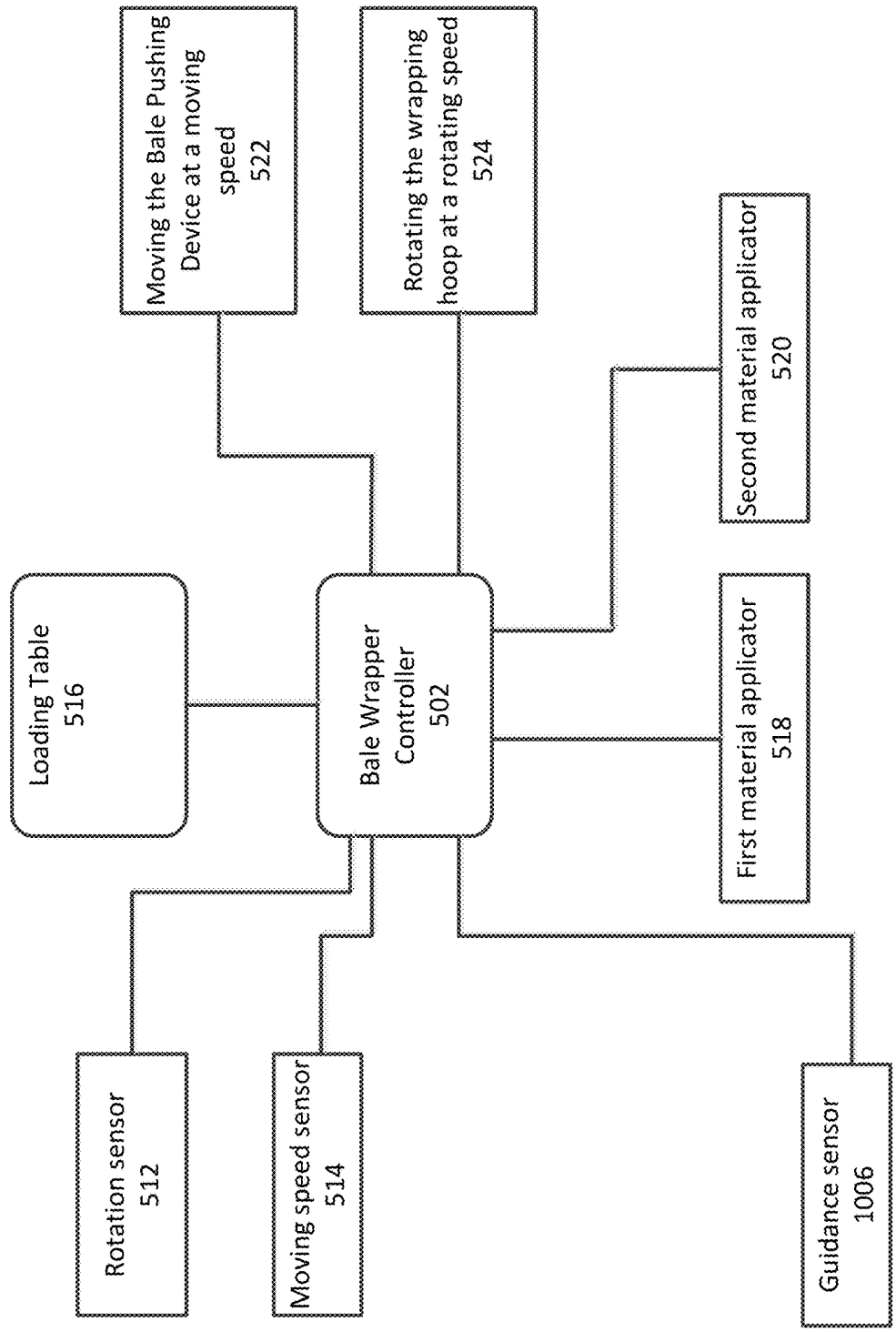
FIG. 10 is a block diagram of a control system for a bale wrapping device with wrapping based on bale position, according to one embodiment.
Figure 11:
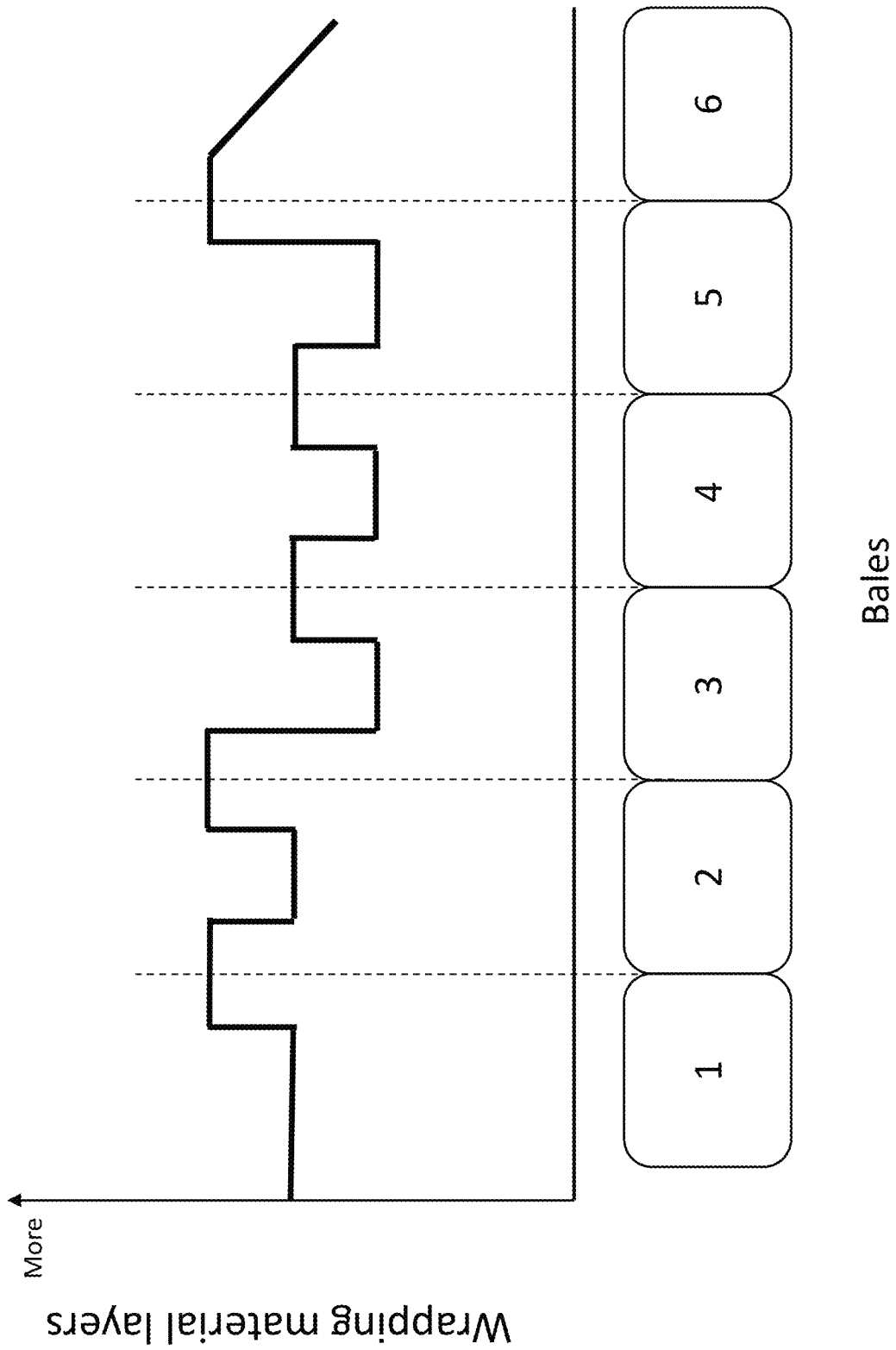
FIG. 11 is a graph of wrapping material quantity based on bale position, according to one embodiment.

FIG. 10 is a block diagram of a control system for a bale wrapping device with wrapping based on bale position. In a further embodiment, the position along the row of bales is determined by at least one of an operator input, a feedback signal from a guidance sensor 1006, or a signal indicative of a stage in a series of stages (i.e. monitoring the position in a sequence of events that occur in a specific order). The guidance sensor 1006 may be a laser sensor, radar sensor, or any sensor that can detect presence and distance to objects. FIG. 11 is a graph of wrapping material quantity based on bale position. The bale wrapper controller 502 counts the number of wrapping cycles and adjusts the wrapping material applied to the row of bales based on the graph indicating a predetermine threshold of wrapping cycles. For example, the bale wrapper controller 502 controls application of a first quantity of wrapping material during a first number of wrapping cycles and at least a second quantity of wrapping material during a second number of wrapping cycles.

Figure 12:
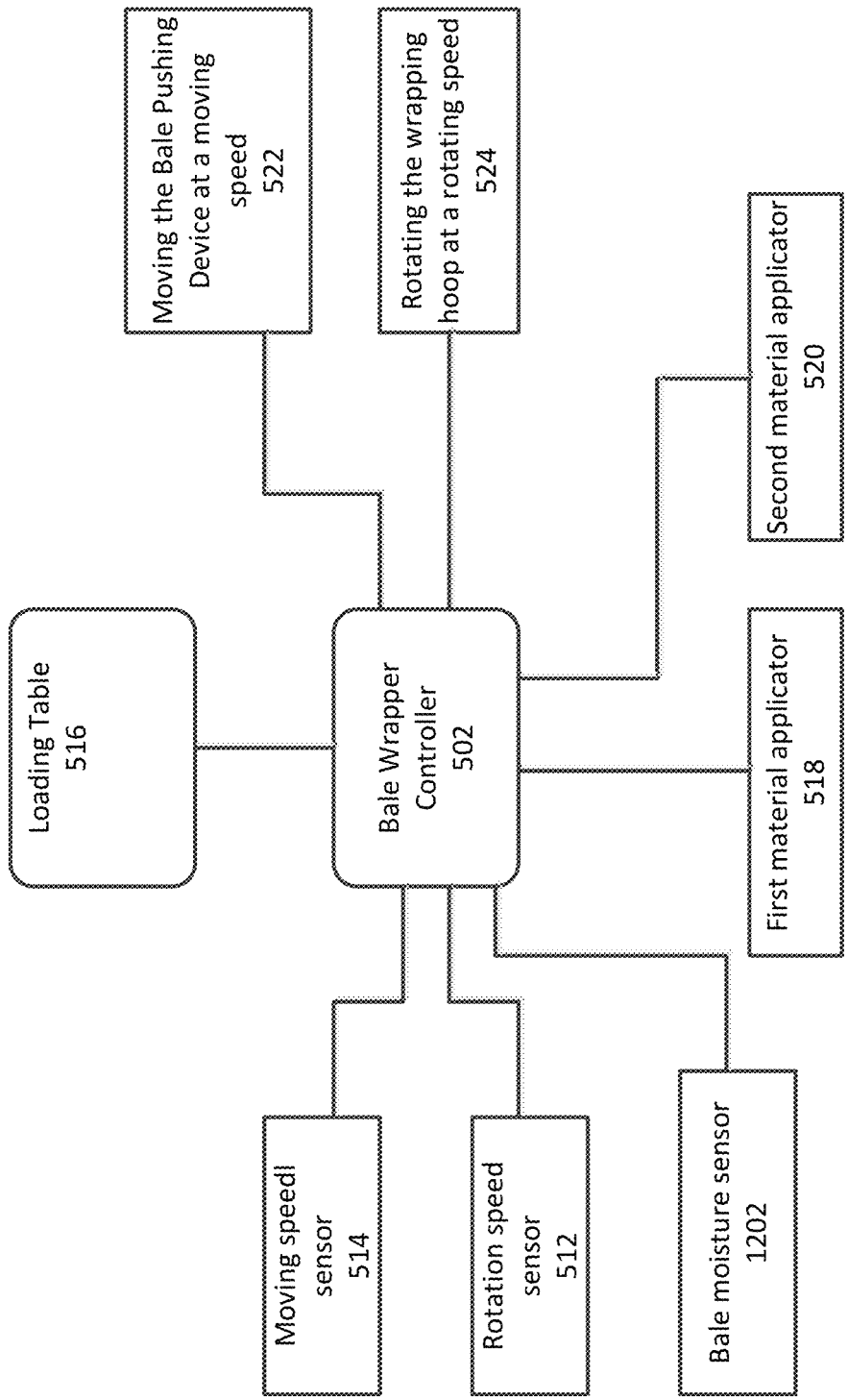
FIG. 12 is a block diagram of a control system for a bale wrapping device based on bale moisture, according to one embodiment.

FIG. 12 is a block diagram of a control system for a bale wrapping device based on bale moisture. In another method for wrapping a group of bales in a bale wrapper, a bale is placed on a loading table 516 of the bale wrapper and a bale moisture sensor 1202 makes a measurement indicative of a moisture content of the bale. The bale moisture sensor 1202 may be a moisture sensor that includes a sensor rod that can penetrate into a bale. Bale wrapper controller 502 receives the signal indicative of the moisture content and determines a wrapping material quantity based on at least one of a moisture content, a storage duration and a final bale quality. Regarding FIG. 9, the interactive interface may include an input slot for entering a bale quality 914 and a storage duration 916. The bale wrapper controller 502 is configured to adjust the wrapping material quantity applied to the bale, based on a moisture reading, storage duration and final bale quality.

For example, the operator inputs a storage duration 916 into display 900, which is input into the bale wrapper controller 502, a first bale is loaded on the bale wrapper loading table 516 and a moisture measurement is made by the bale moisture sensor 1202 to determine the moisture content of the first bale, the bale wrapper controller 502 adjusts the wrapping material quantity to match amount needed to achieve the input storage duration 916, the bale pushing device 104 moves the first bale through the bale wrapping hoop 110, and the bale wrapping hoop 110 rotates to apply the instructed wrapping material quantity as indicated by the bale wrapper controller 502, a second bale is loaded on the bale wrapper loading table 516 and a moisture measurement is made by the bale moisture sensor 1202 to determine the moisture content of the second bale, the bale wrapper controller 502 adjusts the wrapping material quantity to match an amount needed to achieve the input storage duration 916, the bale pushing device 104 moves the second bale through the bale wrapping hoop 110, and the bale wrapping hoop 110 rotates to apply the instructed wrapping material quantity as indicated by the bale wrapper controller 502.

An aspect is a method for wrapping a group of bales in a bale wrapper, that includes determining by a moisture sensor, a moisture content of a bale in a group of bales, receiving by a wireless receiver a moisture content of the bale, a bale wrapper controller, determining a wrapping material quantity based on at least one of a moisture content, a storage duration and a final bale quality, and adjusting, by the bale wrapper controller, the wrapping material quantity applied to the bale, based on a moisture content of the bale.

In one embodiment, the bale moisture sensor 1202 is attached to the bale wrapper frame 106 and measures the bale moisture content before the bale begins to move on the bale wrapper loading table 516.

In a further embodiment, the bale moisture sensor 1202 is attached to the bale pushing device 104 and measures the bale moisture content as the bale begins to move on the bale wrapper loading table 516.

In a further embodiment, the bale moisture sensor 1202 is attached to the bale pushing device 104 in a manner to penetrate into the bale, and measures the bale moisture content as the bale begins to move on the bale wrapper loading table 516.

In a further embodiment, the bale moisture sensor 1202 is retractively attached to the bale pushing device 104 in a manner to penetrate into the bale when the bale pushing device 104 contacts the bale, and measures the bale moisture content as the bale begins to move on the bale wrapper loading table 516.

In another method for wrapping a group of bales in a bale wrapper, the bale wrapper controller 502 compares a theoretical applied wrapping material quantity to an actual applied wrapping material quantity and adjusts the ratio of the bale pushing device travel velocity to the bale wrapping hoop rotational velocity until the actual applied wrapping material quantity is equal to the theoretical applied wrapping material quantity.

In one embodiment, the bale wrapper controller 502 receives feedback from a first speed sensor that measures the speed of the bale wrapping hoop 110 and compares the feedback from the first speed sensor to a desired theoretical speed and adjusts an input to a drive wheel drivingly contacting the bale wrapping hoop 110 until the feedback from the first speed sensor matches the desired theoretical speed.

In one embodiment, the bale wrapper controller 502 makes an adjustment to the quantity of wrapping material, (i.e. the number of layers) from a first quantity on the surface of a first bale, to a second quantity on a seam between the first bale and a second bale (seam layers), and further makes an adjustment to the quantity of wrapping material to a third quantity on a surface of the second bale.

In a further embodiment, the bale wrapper controller 502 makes an adjustment to the quantity of wrapping material, (i.e. the number of layers) from a first quantity on the surface of a first bale, to a second quantity on a seam between the first bale and a second bale, and further makes an adjustment to the quantity of wrapping material to a third quantity on a surface of the second bale wherein the first and third quantities of wrapping material are the same.

When a bale wrapper is applying additional layers at the intersection of a first bale and a second bale (seam layers) the position of the intersection must be known to the bale wrapper controller. This is done with a mechanical setting or a programmed bale length, however, if the bale length does not match a predetermined setting or the setting is not programmed correct, wrapping material may be applied improperly, leading to wasted wrapping material on a first portion of the row of bales and inadequate wrapping material leading to spoilage on a second portion of the row of bales.

Figure 13:
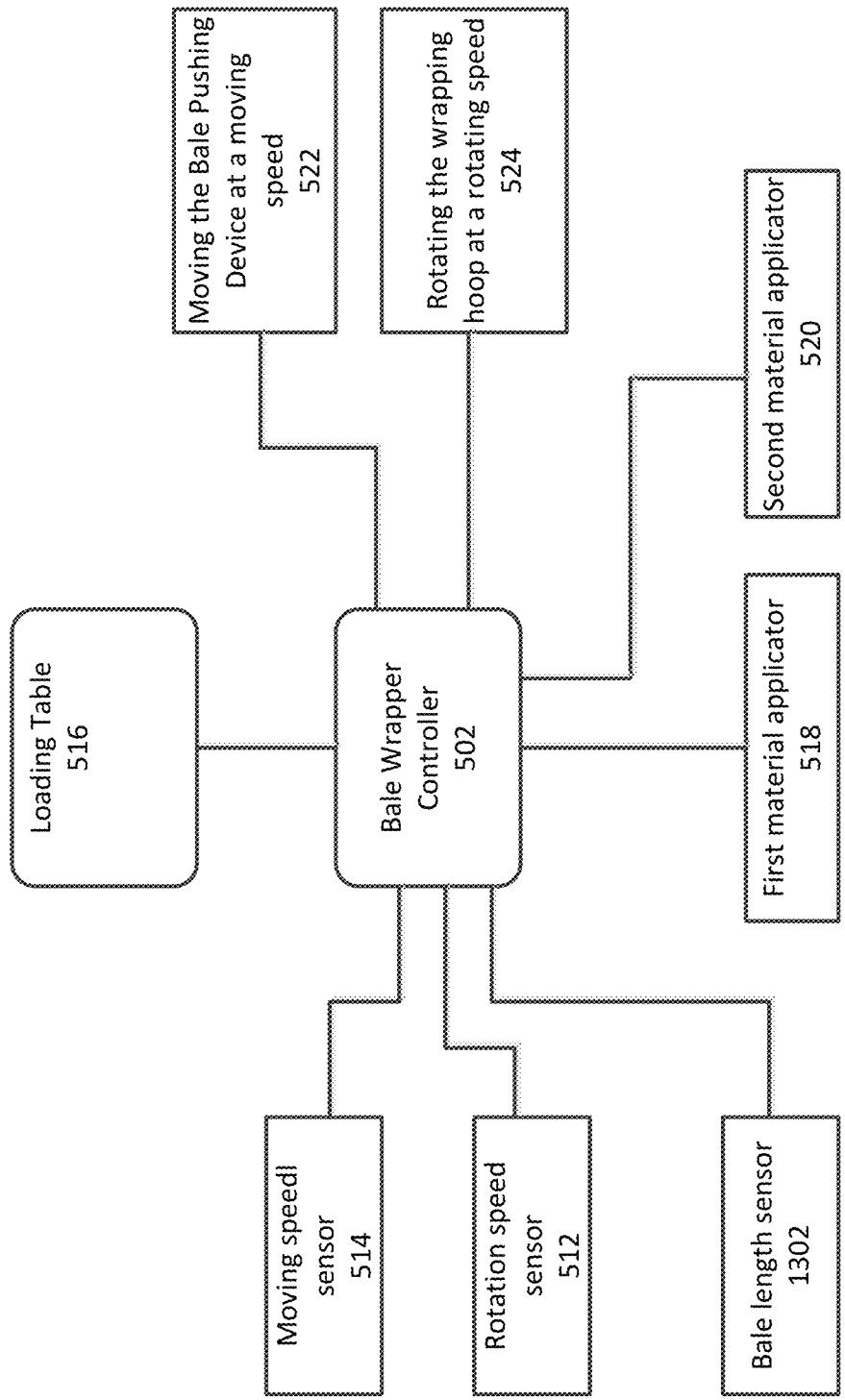
FIG. 13 is a block diagram of a control system for a bale wrapping device based on bale length, according to one embodiment.

FIG. 13 is a block diagram of a control system for a bale wrapping device based on bale length. In a further method of wrapping a group of bales in a bale wrapper, the bale wrapper controller 502 makes an adjustment to the quantity of wrapping material, (i.e. the number of layers) from a first quantity on the surface of a first bale, to a second quantity on a seam between the first bale and a second bale, and further makes an adjustment to the quantity of wrapping material to a third quantity on a surface of the second bale wherein the adjustment is determined based on a parameter or set of parameters representative of actual bale length. A bale length sensor 1302 may be used to determine an actual bale length. The actual bale length may be measured using a camera that takes an image of a bale and a calculation of length is made using the image.

Figure 14:
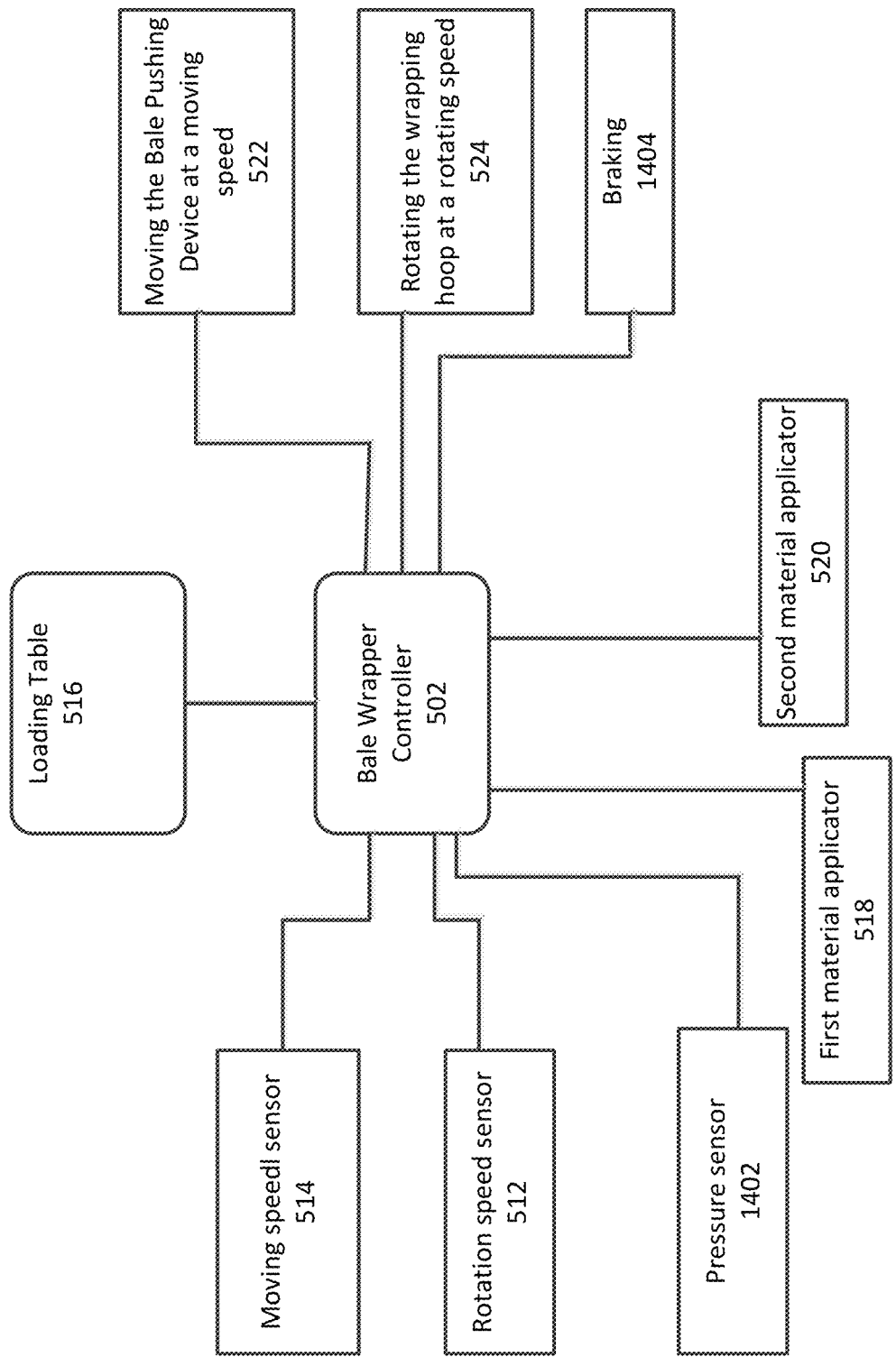
FIG. 14 is a block diagram of a control system for a bale wrapping device with pressure, according to one embodiment.

FIG. 14 is a block diagram of a control system for a bale wrapping device based on pressure. The parameter or set of parameters representative of actual bale length may include a pressure signal from a pressure sensor 1402 mounted on a plunger to measure force representative of the amount of force pushing on a bale to be wrapped, wherein a first pressure signal indicates a first bale moving toward a second bale and a second pressure signal indicates the first bale in contact with the second bale and a position signal indicative of a position of the plunger within the bale wrapper. The pressure sensor 1402 is a sensor that measures force, such as a piezoelectric sensor. The pressure sensor 1402 is connected to the bale wrapper controller 502.

Additionally, the parameter or set of parameters representative of actual bale length may include a signal from a visual or reflective sensor, such as laser light, camera, LIDAR, radar, etc. indicative of a length of at least a first bale. The visual or reflective sensor, such as laser, camera, LIDAR, radar, etc. may also indicate a gap between a first bale and a second bale representative of the position of the plunger within the bale wrapper.

In another embodiment, the bale wrapper controller 502 compares a programmed bale length and an actual bale length determined by the parameter or set of parameters representative of actual bale length and adjusts the bale wrapper based on the determining, wherein the adjustments include at least one of adjustment of a brake setting 1404 and a rotational speed 524 of the wrapping hoop 110, and the bale wrapper controller 502 replaces the programmed bale length with the actual bale length determined by the parameter or set of parameters representative of actual bale length.

In another embodiment, the bale wrapper controller 502 compares a programmed bale length and an actual bale length determined by the parameter or set of parameters representative of actual bale length and adjusts the bale wrapper based on the determining, wherein the adjustments include at least one of adjustment of a brake setting 1404 and a rotational speed 524 of the wrapping hoop 110, and the bale wrapper controller 502 sends a notification to the display 900 to notify the operator that the programmed bale length is different from the actual bale length determined by the parameter or set of parameters representative of actual bale length.

Figure 15:
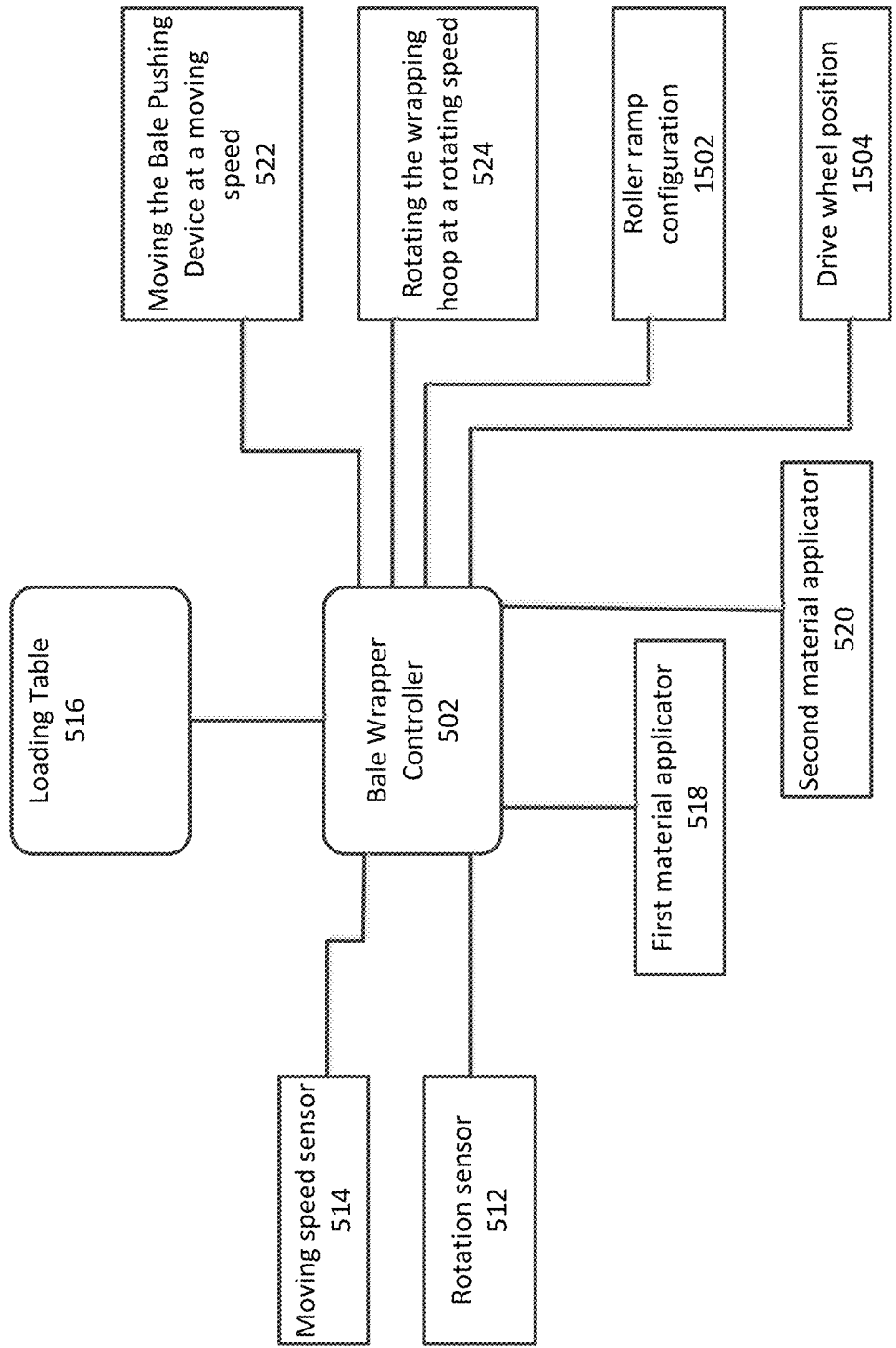
FIG. 15 is a block diagram of a control system for a bale wrapping device with roller ramp, according to one embodiment.

FIG. 15 is a block diagram of a control system for a bale wrapping device with roller ramp. In another method for wrapping a group of bales in a bale wrapper, the bale wrapper wraps a first group of bales with the bale wrapper in a first configuration with a roller ramp 1502 of the bale wrapper in a substantially level position relative to a ground surface and a second group of bales with the bale wrapper in a second configuration with the roller ramp 1502 of the bale wrapper at an angle terminating at the ground surface, wherein the bale wrapper controller 502 instructs the bale wrapper to shift from the first configuration to the second configuration.

In a further method for wrapping a group of bales in a bale wrapper, the bale wrapper controller 502 instructs the bale wrapper to wrap one of a predetermined number of bales and a predetermined length of bales in said first group of bales in a first substantially level position, the bale wrapper controller 502 then adjusts a drive wheel position 1504 from a first extended position to a second retracted position to lower the bale wrapper from the first substantially level position to a second angled position, the bale wrapper controller 502 instructs the bale wrapper to wrap a second group of bales in the second angled position.

Referring again to FIG. 14, in another embodiment of a method of wrapping bales in a bale wrapper, a bale wrapper controller 502 adjusts a brake setting 1404 to achieve a predetermined compression ratio, wherein the compression ratio is determined by comparing a bale length and a distance traveled by the bale wrapper during a wrapping cycle.

In a further embodiment, the brake setting 1404 is increased when the compression ratio is lower than the predetermined compression threshold and the brake setting 1404 is decreased when the compression ratio is higher than the predetermined compression threshold.

Figure 16:
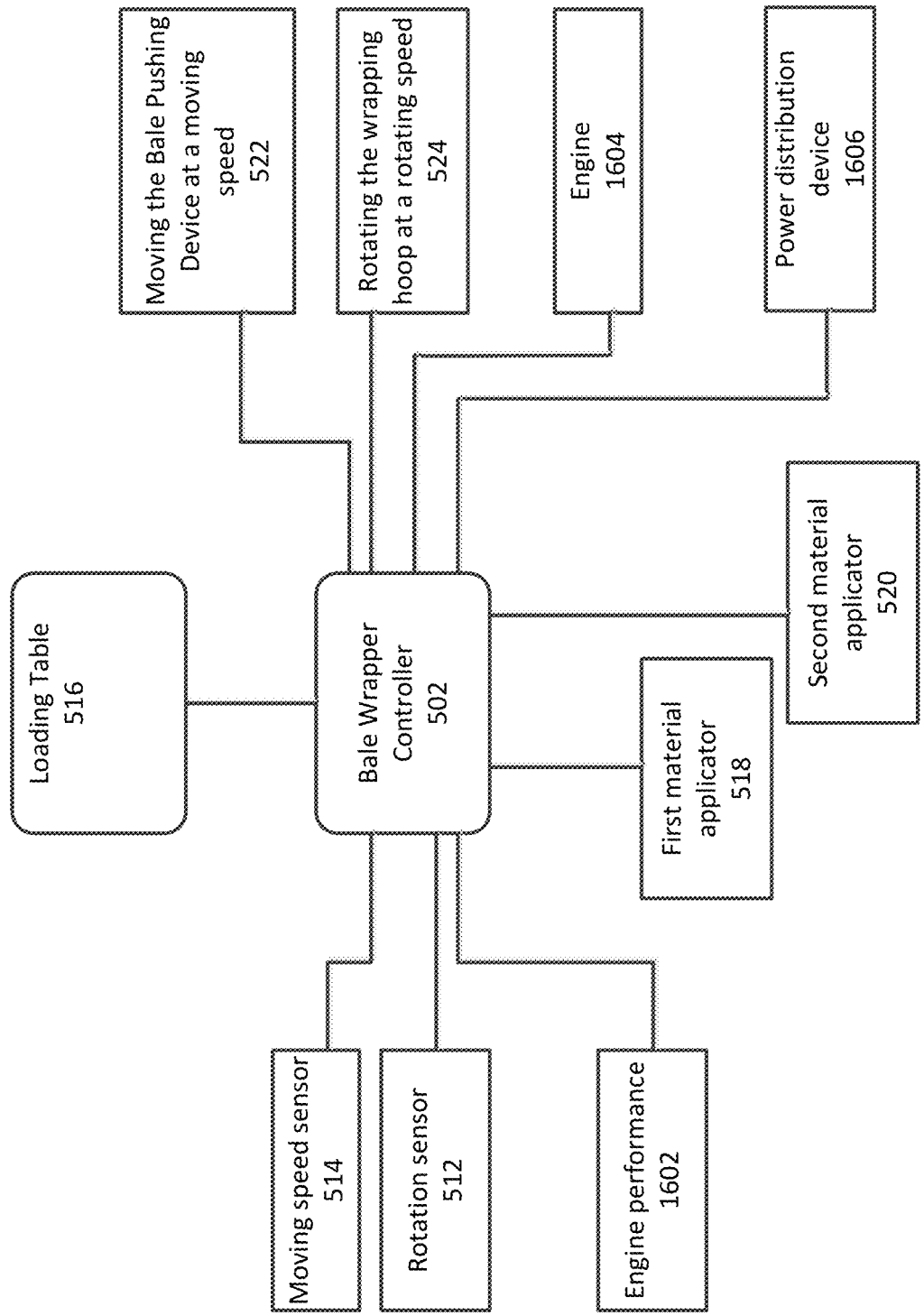
FIG. 16 is a block diagram of a control system for a bale wrapping device with engine performance control, according to one embodiment.

FIG. 16 is a block diagram of a control system for a bale wrapping device with engine performance control. Bale wrapper controller 502 uses performance feedback from bale wrapper to adjust engine performance and feedback on engine performance to adjust the bale wrapper. The engine may provide output parameters that can be sent to the bale wrapper controller 502, including engine speed, power, fuel level, and operating hours. The bale wrapper controller 502 may be configured to monitor the engine parameters so that the condition of the engine can be evaluated, and so that the controller 502 may make adjustments to performance parameters in order to improve such factors as fuel economy.

In one embodiment, the bale wrapper controller 502 receives a signal indicative of the operating efficiency of an engine 1602 of a bale wrapping device, and determines from the signal, a current efficiency level and based on the determining, adjusts one of the engine 1604 and a power distribution device 1606 until the signal indicative of the operating efficiency matches a predetermined level of efficiency. The power distribution for various actuators may be hydraulically operated.

In one embodiment, the power distribution device is a hydraulic pump for providing hydraulic fluid to a hydraulic actuator. In another embodiment the power distribution device is a hydraulic valve for controlling flow of hydraulic fluid in the power distribution system.

Figure 17:
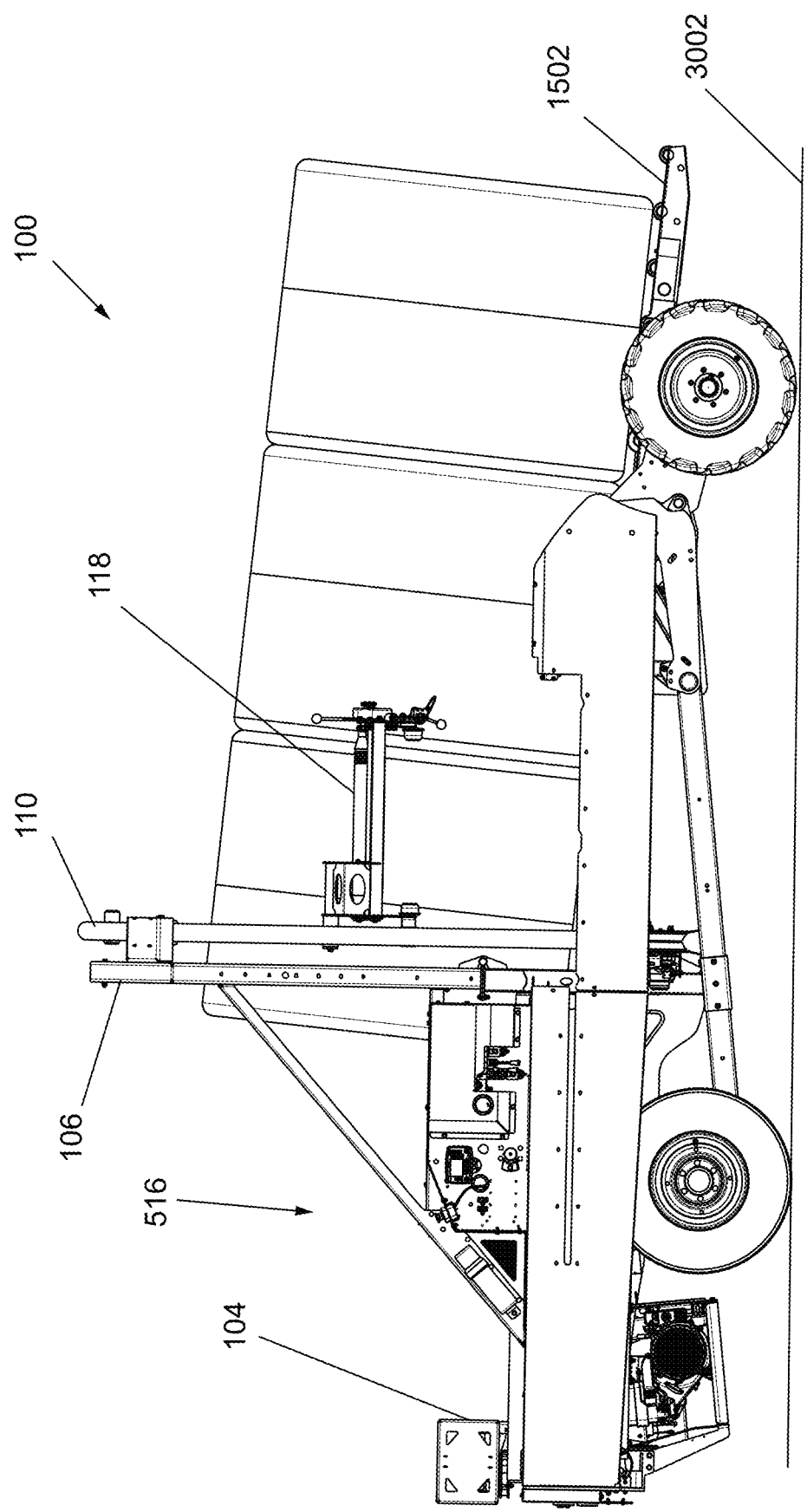
FIG. 17 is a side view of the bale wrapping device illustrated with a group of bales on the bale wrapping device in a raised (substantially level) position, according to one embodiment.

Referring to FIG. 17, illustrated therein is a side view of a bale wrapping device 100 for wrapping a bale. The bale wrapping device 100 includes a bale moving (pushing) device 104, a bale wrapping frame 106, a bale wrapping mechanism 118, a wrapping hoop 110, a loading table 516 and a roller ramp 1502.

The bale wrapper wraps a first group of bales with the bale wrapper in a first configuration with a roller ramp 1502 of the bale wrapper in a substantially level position relative to a ground surface 3002. The bale wrapper controller 502 instructs the bale wrapper to wrap one of a predetermined number of bales and a predetermined length of bales in said first group of bales in a first substantially level position, the bale wrapper controller 502 then adjusts a drive wheel position 1504 from a first extended position to a second retracted position to lower the bale wrapper from the first substantially level position to a second angled position, the bale wrapper controller 502 instructs the bale wrapper to wrap a second group of bales in the second angled position.

Figure 18:
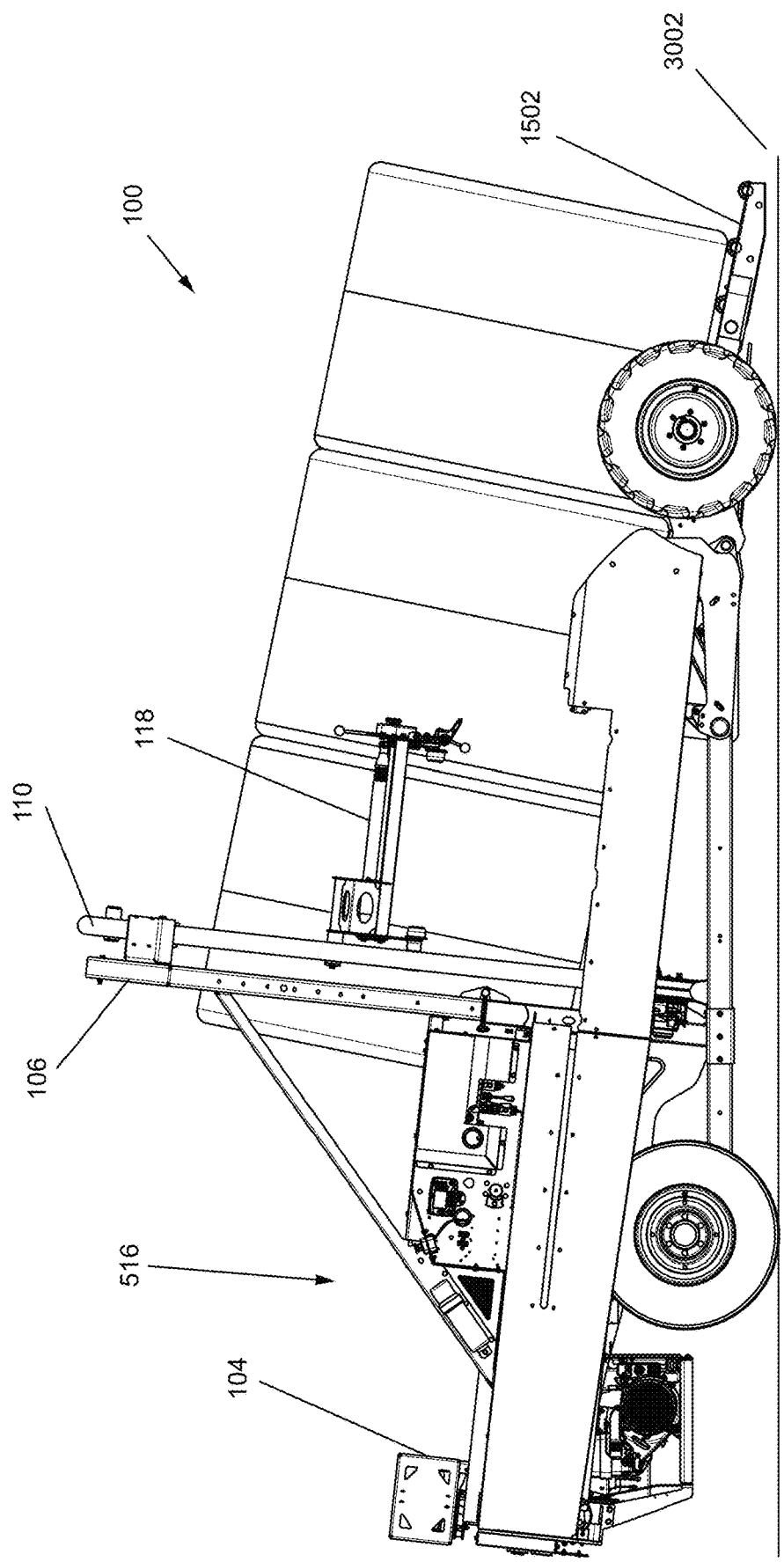
FIG. 18 is a side view of the bale wrapping device illustrated with a group of bales on the bale wrapping device in a lowered (angled) position, according to one embodiment.

Referring to FIG. 18, illustrated therein is a side view of a bale wrapping device 100 for wrapping a bale. The bale wrapping device 100 includes a bale moving (pushing) device 104, a bale wrapping frame 106, a bale wrapping mechanism 118, a wrapping hoop 110, a loading table 516 and a roller ramp 1502.

The bale wrapper wraps a second group of bales with the bale wrapper in a second configuration with the roller ramp 1502 of the bale wrapper at an angle terminating at the ground surface 3002. The bale wrapper controller 502 instructs the bale wrapper to wrap a second group of bales in the second angled position.

When a bale wrapper is applying additional layers at the intersection of a first bale and a second bale (seam layers) the bale diameter must be known to the bale wrapper controller. This is done with a mechanical setting or a programmed bale diameter, however, if there is a difference between a first bale diameter and a second bale diameter, the wrapping material may be applied improperly, leading to wasted wrapping material on a first bale seam or inadequate wrapping material leading to spoilage on a second bale seam.

Figure 19:
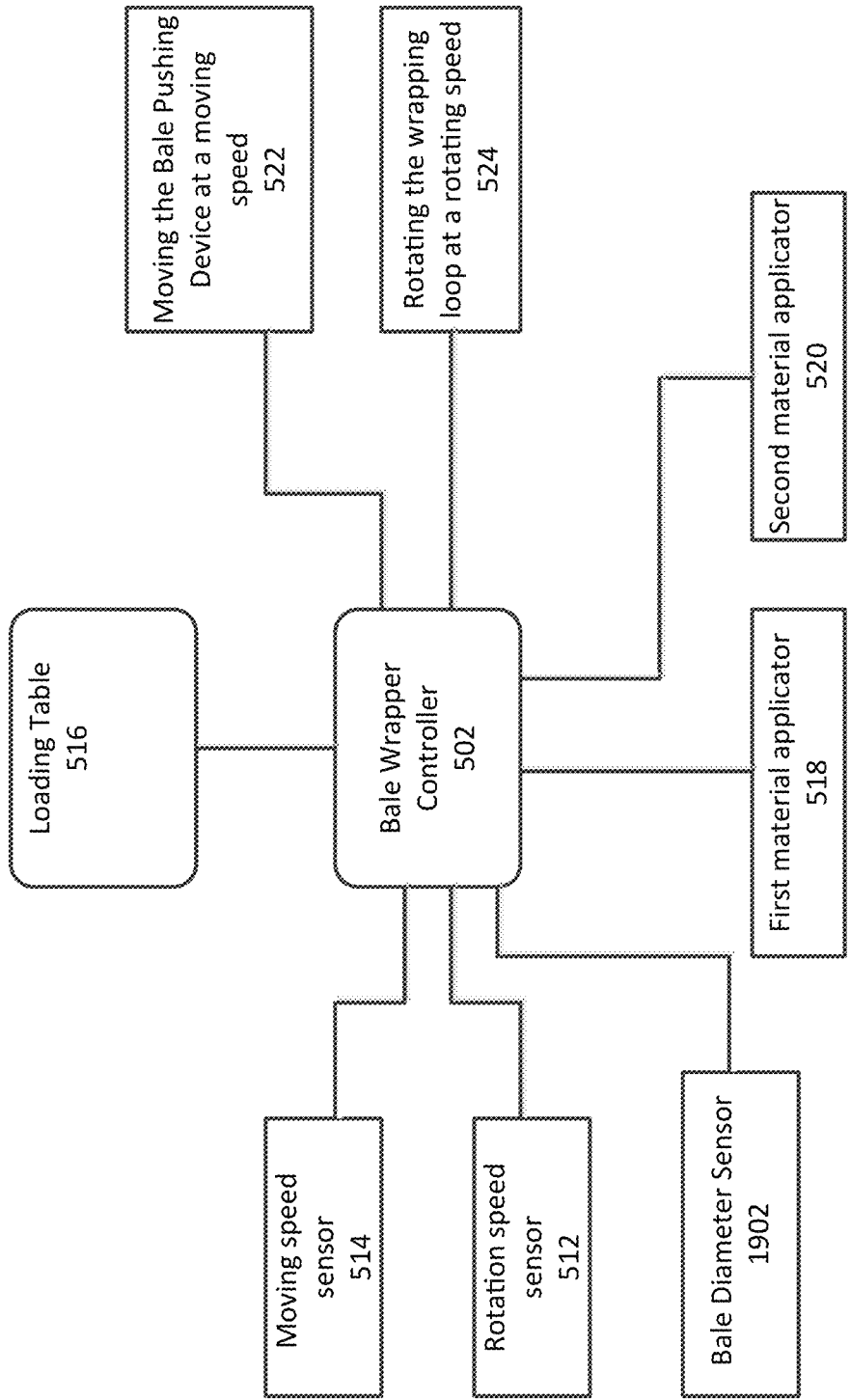
FIG. 19 is a block diagram of a control system for a bale wrapping device based on bale diameter, according to one embodiment.

FIG. 19 is a block diagram of a control system for a bale wrapping device based on bale diameter. In a further method of wrapping a group of bales in a bale wrapper, the bale wrapper controller 502 makes an adjustment to the quantity of wrapping material, (i.e. the number of layers) from a first quantity on the surface of a first bale, to a second quantity on a seam between the first bale and a second bale, and further makes an adjustment to the quantity of wrapping material to a third quantity on a surface of the second bale wherein the adjustment is determined based on a parameter or set of parameters representative of actual bale diameter. A bale diameter sensor 1902 may be used to determine an actual bale diameter. The actual bale diameter may be measured using a camera that takes an image of a bale and a calculation of diameter is made using the image.

Additionally, the parameter or set of parameters representative of actual bale diameter may include a signal from a visual or reflective sensor, such as laser light, camera, LIDAR, radar, etc. indicative of a diameter of at least a first bale.

Figure 20:
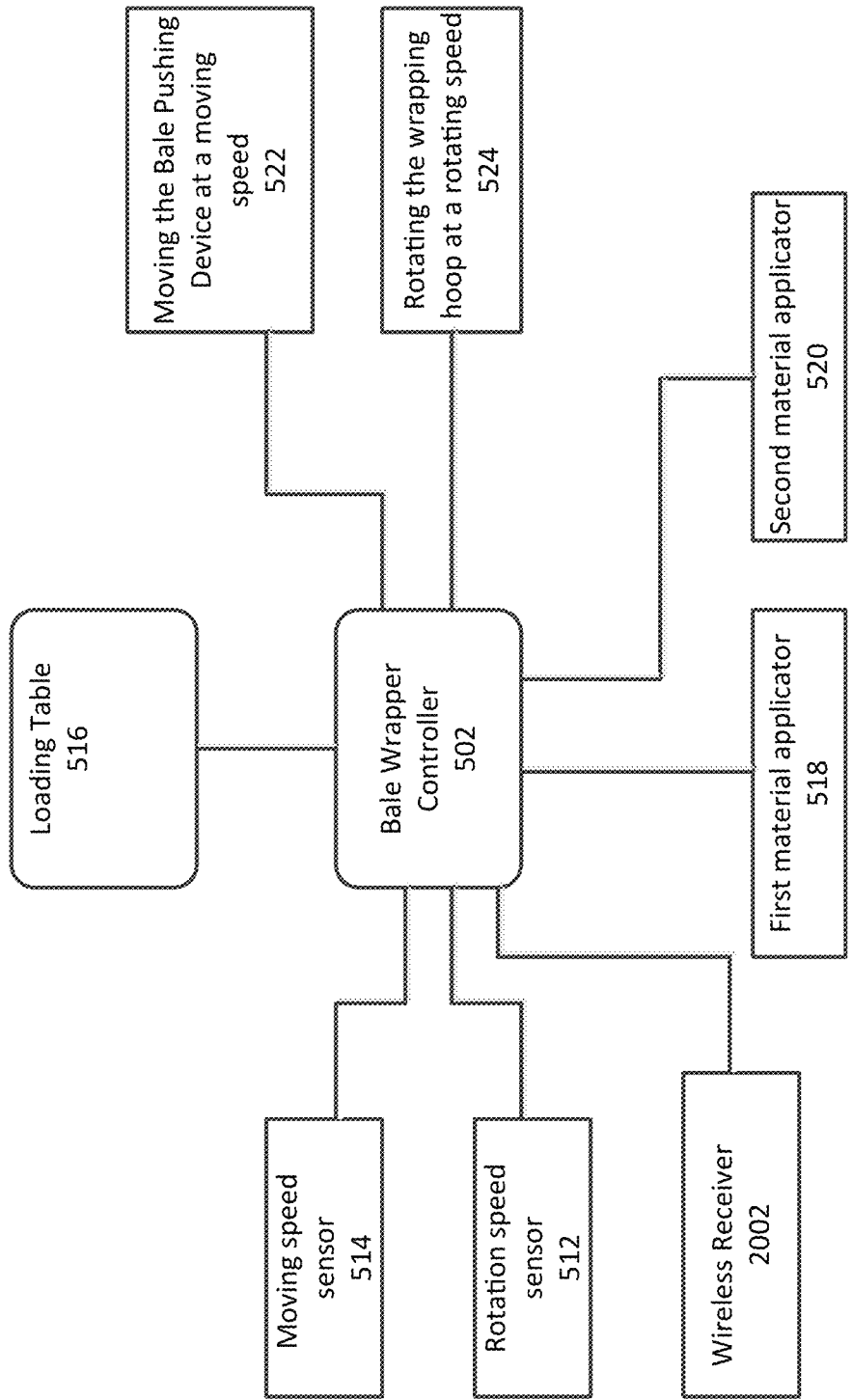
FIG. 20 is a block diagram of a control system for a bale wrapping device based on input from a wireless receiver, according to one embodiment.

FIG. 20 is a block diagram of a control system for a bale wrapping device with wireless receiver 2002. Bale wrapper controller 502 receives a signal indicative of a moisture content of a first bale from the wireless receiver 2002 and determines a wrapping material quantity based on the moisture content of the bale. In another method for wrapping a group of bales in a bale wrapper, a bale is placed on a loading table 516 of the bale wrapper and a wireless receiver 2002 receives a signal indicative of a moisture content of the bale. Bale wrapper controller 502 receives the signal indicative of the moisture content from the wireless receiver and determines a wrapping material quantity based on the moisture content of the bale.

In another method for wrapping a group of bales in a bale wrapper, a bale is placed on a loading table 516 of the bale wrapper and a wireless receiver 2002 receives a signal indicative of a bale weight.

For example, a baler may utilize a moisture sensor or a weight sensor to determine at least one of a moisture content or a weight of a bale when the bale is formed. The baler then marks the bale, for example with an RFID tag, to indicate at least one of a bale moisture content and a bale weight. The bale is placed on a loading table 516 of the bale wrapper and the bale wrapper controller 502 receives the signal indicative of the moisture content and/or the weight of the bale from the marking of the bale through the wireless receiver and determines a wrapping material quantity based on the moisture content of the bale and records the weight of the bale to a database.

The invention claimed is:

1. A method for automatic wrapping a group of bales in a bale wrapper, comprising:
    placing a first bale in the group of bales on a loading table of the bale wrapper;
    performing a wrapping cycle including:
    rotating a wrapping hoop to apply a wrapping material to a bale surface;
    moving a bale pushing device from a first position toward a second position to push the first bale through the wrapping hoop;
    dispensing from at least a first material applicator and a second material applicator;
    determining presence of the wrapping material, by at least one sensor on the wrapping hoop;
    adjusting based on the determining, at least a ratio of moving speed of the bale pushing device to rotational speed of the wrapping hoop, to apply a predetermined amount of wrapping material independent of the presence of wrapping material dispensing from the first material applicator and the second material applicator;
    continuing to move the bale pushing device until the second position is reached;
    stopping the rotation of the wrapping hoop; and
    moving the bale pushing device from the second position to the first position.

2. The method of claim 1, wherein the determining further includes:
    at a first time the sensor on the wrapping hoop determining the presence of wrapping material dispensing from the first material applicator and the second material applicator; and
    applying the wrapping material at a predetermined amount;
    at a second time the sensor on the wrapping hoop determining the presence of wrapping material dispensing from a first material applicator only, and based on the determining, reducing the ratio of moving speed of the bale pushing device to rotational speed of the wrapping hoop to apply the predetermined amount of wrapping material; and
    at a third time the sensor on the wrapping hoop determining the presence of wrapping material dispensing from the first material applicator and the second material applicator, and based on the determining, increasing the ratio of moving speed of the bale pushing device to rotational speed of the wrapping hoop to apply the predetermined amount of wrapping material.

3. The method of claim 1, wherein the determining further includes:
    at a first time the sensor on the wrapping hoop determining the presence of wrapping material dispensing from the first material applicator and the second material applicator, and applying the wrapping material at a predetermined amount;
    at a second time the sensor on the wrapping hoop determining the presence of wrapping material dispensing from the first material applicator, the second material applicator and a third material applicator and based on the determining; and
    increasing the ratio of moving speed of the bale pushing device to rotational speed of the wrapping hoop to apply the predetermined amount of wrapping material.

4. The method of claim 1, wherein the adjusting further includes:
    receiving, by a bale wrapper controller, a wrapping material signal indicative of the presence of the wrapping material dispensing from at least one of the first material applicator, the second material applicator and a third material applicator;
    based on the wrapping material signal, determining a quantity of active material applicators; and
    based on the determination of the quantity of active material applicators, adjusting, by the bale wrapper controller, at least one of the moving speed of the bale pushing device and rotational speed of the wrapping hoop to apply the predetermined amount of wrapping material.

5. The method of claim 1, wherein the adjusting further includes:
    receiving, by the bale wrapper controller, a wrapping material signal indicative of no wrapping material on any of the first material applicator, the second material applicator, the third material applicator, and a fourth material applicator; and
    when the quantity of active material on the applicators is zero, adjusting, by the bale wrapper controller, the moving speed of the bale pushing device and rotational speed of the wrapping hoop to zero.

6. The method of claim 1, wherein the adjusting further includes:
adjusting the ratio of moving speed of the bale pushing device to rotational speed of the wrapping hoop by an output from a bale wrapper controller;
receiving, by the bale wrapper controller, a wrapping material signal indicative of the presence of the wrapping material dispensing from at least the first material applicator and the second material applicator;
based on the wrapping material signal, determining a quantity of active material applicators; and
based on the determination of the quantity of active material applicators, adjusting, by the bale wrapper controller, at least one of the moving speed of the bale pushing device and rotational speed of the wrapping hoop to apply the predetermined amount of wrapping material.

7. The method of claim 1, further comprising:
measuring, by a remaining material sensor, a parameter indicative of at least a first remaining amount of material on at least the first material applicator; and
informing, by a bale wrapper controller, an operator when the at least first remaining amount of material is below a predetermined remaining amount of material threshold.

8. The method of claim 7, wherein the measuring further includes
measuring, by the remaining material sensor, a parameter of a roll of wrapping material on at least the first material applicator;
when the parameter of the roll of material corresponds to a level that indicates the roll is below a first predetermined remaining amount of material threshold, alerting, by the bale wrapper controller, the operator through at least one of a first visual or audible warning; and
when the parameter of the roll of material corresponds to a level that indicates the roll is below a second predetermined remaining amount of material threshold, alerting, by the bale wrapper controller, the operator through at least one of a second visual or audible warning,
wherein the first visual or audible warning is different from the second visual or audible warning.

9. The method of claim 1, wherein the group of bales is a row of bales, the method further comprising:
adjusting, by the bale wrapper, a quantity of wrapping material applied to the row of bales, based on the position within the row of bales, including
applying a first quantity of wrapping material to a first portion of the row of bales and applying a second quantity of wrapping material to a second portion of the row of bales,
wherein the first quantity of wrapping material is different from the second quantity of wrapping material based on position of the bale wrapper along the row of bales.

10. The method of claim 9, wherein the position along the row of bales is determined by at least one of an operator input, a feedback signal from a guidance sensor, or a signal indicative of a stage in a series of stages, and
wherein the adjusting includes counting a number of wrapping cycles and adjusting the wrapping material applied to the row of bales based on a predetermined threshold of wrapping cycles.

11. A method of claim 1, further comprising:
comparing, by a bale wrapper controller, a theoretical applied wrapping material quantity to an actual applied wrapping material quantity; and
adjusting the ratio of a bale pushing device travel velocity to the bale wrapping hoop rotational velocity until the actual applied wrapping material quantity is equal to the theoretical applied wrapping material quantity.

12. The method of claim 11, further comprising:
receiving, by the bale wrapper controller, feedback from a first speed sensor on the bale wrapping hoop;
comparing the feedback from the first speed sensor to a desired theoretical speed; and
adjusting an input to a drive wheel drivingly contacting the bale wrapping hoop until the feedback from the first speed sensor matches the desired theoretical speed.

13. The method of claim 1, further comprising:
adjusting a quantity of wrapping material, from a first quantity on the surface of a first bale, to a second quantity on a seam between the first bale and a second bale; and
further adjusting the quantity of wrapping material to a third quantity on a surface of the second bale.

14. The method of claim 1, further comprising:
adjusting a quantity of wrapping material, from a first quantity on the surface of a first bale, to a second quantity on a seam between the first bale and a second bale; and
further adjusting the quantity of wrapping material to a third quantity on a surface of the second bale,
wherein the first and third quantities of wrapping material are the same.

15. The method of claim 1, further comprising:
adjusting a quantity of wrapping material, from a first quantity on the surface of a first bale, to a second quantity on a seam between the first bale and a second bale; and
further adjusting the quantity of wrapping material to a third quantity on a surface of the second bale,
wherein the adjustment is determined based on a parameter or set of parameters representative of actual bale length.

16. The method of claim 15, wherein the parameter or set of parameters representative of actual bale length includes a pressure signal from a plunger representative of the amount of force pushing on a bale to be wrapped,
wherein a first pressure indicates a first bale moving toward a second bale and a second pressure indicates the first bale in contact with the second bale and a position signal from the plunger representative of the position of the plunger within the bale wrapper.

17. The method of claim 15, further comprising:
comparing, by the bale wrapper controller, a programmed bale length and an actual bale length determined by the parameter or set of parameters representative of actual bale length;
adjusting the bale wrapper based on the determining, wherein the adjustments include at least one of a brake setting and a rotational speed of the wrapping hoop; and
replacing, by the bale wrapper controller, the programmed bale length with the actual bale length determined by the parameter or set of parameters representative of actual bale length.

18. The method of claim 15, further comprising:
comparing, by the bale wrapper controller, a programmed bale length and an actual bale length determined by the parameter or set of parameters representative of actual bale length;
adjusting the bale wrapper based on the determining, wherein the adjustments include at least one of a brake setting and a rotational speed of the wrapping hoop; and
notifying, by the bale wrapper controller, an operator that the programmed bale length is different from the actual bale length determined by the parameter or set of parameters representative of actual bale length.

19. The method of claim 1, further comprising:
wrapping a first group of bales with the bale wrapper in a first configuration with a roller ramp of the bale wrapper in a substantially level position relative to a ground surface;
wrapping a second group of bales with the bale wrapper in a second configuration with the roller ramp of the bale wrapper at an angle terminating at the ground surface,
wherein the bale wrapper controller instructs the bale wrapper shift from the first configuration to the second configuration.

20. The method of claim 19, further comprising:
wrapping one of a predetermined number of bales and a predetermined length of bales in said first group of bales in a first substantially level position;
adjusting, by the bale wrapper controller, a drive wheel position from a first extended position to a second retracted position to lower the bale wrapper from the first substantially level position to a second angled position; and
instructing, by the bale wrapper controller, the bale wrapper to wrap a second group of bales in the second angled position.

21. The method of claim 1, further comprising:
adjusting, by a bale wrapper controller, a brake setting to achieve a predetermined compression ratio,
wherein the compression ratio is determined by comparing a bale length and a distance traveled by the bale wrapper during a wrapping cycle.

22. The method of claim 21, wherein the brake setting is increased when the compression ratio is lower than the predetermined compression threshold and the brake setting is decreased when the compression ratio is higher than the predetermined compression threshold.

23. The method of claim 1, further comprising:
obtaining, by a bale wrapper controller, performance feedback from bale wrapper;
adjusting engine performance; and
using the feedback on engine performance to adjust the bale wrapper.

24. The method of claim 1, further comprising:
receiving, by a bale wrapper controller, a signal indicative of operating efficiency of an engine of a bale wrapping device;
determining from the signal, a current efficiency level; and
based on the determining, adjusting one of the engine and a power distribution device until the signal indicative of the operating efficiency matches a predetermined level of efficiency.

* * * * *